US010003138B2

(12) United States Patent
Annen

(10) Patent No.: US 10,003,138 B2
(45) Date of Patent: Jun. 19, 2018

(54) PUMP DEVICE AND TERMINAL MEMBER

(71) Applicant: ASMO CO., LTD., Kosai, Shizuoka-pref. (JP)

(72) Inventor: Satoshi Annen, Toyohashi (JP)

(73) Assignee: ASMO CO., LTD., Kosai (JP)

( * ) Notice: Subject to any disclaimer, the term of this patent is extended or adjusted under 35 U.S.C. 154(b) by 477 days.

(21) Appl. No.: 14/667,685

(22) Filed: Mar. 25, 2015

(65) Prior Publication Data

US 2015/0280333 A1 Oct. 1, 2015

(30) Foreign Application Priority Data

Mar. 31, 2014 (JP) ................................ 2014-072917
Aug. 6, 2014 (JP) ................................ 2014-160537

(51) Int. Cl.
*H02K 5/24* (2006.01)
*H01R 4/48* (2006.01)
(Continued)

(52) U.S. Cl.
CPC ........... *H01R 4/48* (2013.01); *F04D 13/0686* (2013.01); *F04D 29/661* (2013.01)

(58) Field of Classification Search
CPC ...... H02K 11/026; H02K 11/02; H02K 5/225; H02K 11/024; H02K 5/24
(Continued)

(56) References Cited

U.S. PATENT DOCUMENTS 5,064,342 A * 11/1991 Iwai ..................... H02K 11/026
310/51
5,345,124 A * 9/1994 Lang ....................... F04C 15/00
310/220
(Continued)

FOREIGN PATENT DOCUMENTS

JP S54-52693 U 4/1979
JP S57-3381 A 1/1982
(Continued)

OTHER PUBLICATIONS

English language translation of the following: Office action dated Oct. 31, 2017 from the JPO in a Japanese patent application No. 2014-072917 corresponding to the instant patent application. This office action translation is submitted now in order to supplement the understanding of the cited reference which is being disclosed in the instant Information Disclosure Statement.
(Continued)

*Primary Examiner* — Thanh Lam
(74) *Attorney, Agent, or Firm* — Solaris Intellectual Property Group, PLLC

(57) ABSTRACT

In a noise suppression device of a washer pump, a first capacitor and a second capacitor are disposed with their height directions along a first direction orthogonal to an axial direction of the washer pump. This thereby enables installation space for the first capacitor and the second capacitor to be suppressed from becoming larger in the axial direction. A second terminal of the second capacitor is disposed between first terminals of the first capacitor. This thereby enables the installation space of the first capacitor and the second capacitor to be made smaller in the first direction and in a second direction orthogonal to the axial direction. The space between the pair of first terminals (the second terminals) is accordingly efficiently utilized for disposing the second terminal (the first terminal), enabling the first capacitor and the second capacitor to be disposed efficiently.

8 Claims, 19 Drawing Sheets

(51) Int. Cl.
*F04D 13/06* (2006.01)
*F04D 29/66* (2006.01)

(58) Field of Classification Search
USPC .......................................... 310/51, 71–72, 89
See application file for complete search history.

(56) References Cited

U.S. PATENT DOCUMENTS

| | | | | |
|---|---|---|---|---|
| 5,942,819 | A * | 8/1999 | Burgess | H02K 11/40 310/239 |
| 6,414,580 | B1 | 7/2002 | Sato et al. | |
| 2002/0163263 | A1* | 11/2002 | Uffelman | F04B 17/03 310/71 |
| 2007/0170789 | A1* | 7/2007 | Kawarai | H02K 11/026 310/51 |
| 2009/0160268 | A1* | 6/2009 | Ragnone | H01R 4/4809 310/51 |
| 2010/0320854 | A1* | 12/2010 | Yamazaki | H02K 5/148 310/72 |
| 2013/0002070 | A1* | 1/2013 | Matsumoto | H02K 11/026 310/71 |

FOREIGN PATENT DOCUMENTS

| | | | |
|---|---|---|---|
| JP | S57-199969 | U | 12/1982 |
| JP | S59-23477 | A | 2/1984 |
| JP | H03-118570 | U | 12/1991 |
| JP | H10-188614 | A | 7/1998 |
| JP | H11-26048 | A | 1/1999 |
| JP | 2001-135368 | A | 5/2001 |
| JP | 2001-286115 | A | 10/2001 |
| JP | 2004-207156 | A | 7/2004 |
| JP | 2007-267448 | A | 10/2007 |
| JP | 2012-44814 | A | 3/2012 |
| JP | 2014-020321 | A | 2/2014 |

OTHER PUBLICATIONS

English language translation of the following: Office action dated Mar. 27, 2018 from the JPO in a Japanese patent application No. 2014-160537 corresponding to the instant patent application. This office action translation is submitted now in order to supplement the understanding of the references cited in the instant Information Disclosure Statement.

* cited by examiner

PUMP DEVICE AND TERMINAL MEMBER

CROSS-REFERENCE TO RELATED APPLICATION

This application claims priority under 35 USC 119 from Japanese Patent Applications No. 2014-072917 filed Mar. 31, 2014 and No. 2014-160537 filed Aug. 6, 2014, the disclosures of which are incorporated by reference herein.

BACKGROUND

Field of the Invention

The present invention relates to a pump device and a terminal member, and in particular relates to a pump device including a noise suppression device, a terminal member, and a pump device including a noise suppression device using the terminal member.

Related Art

There are pump devices that include an electrical noise suppression device (noise suppression device) for suppressing noise from being generated during motor driving (see, for example, Japanese Patent Application Laid-Open (JP-A) No. 2012-44814). Such an electrical noise suppression device is configured including a pair of choke coils and a pair of capacitors. The choke coils and the capacitors are housed in a cylindrical shaped housing. The pair of capacitors is disposed inclined with respect to the axial direction of the housing. This thereby enables the installation space for the capacitors to be made smaller when viewed from along the axial direction of the housing.

However, in such pump device, due to the pair of capacitors being disposed inclined with respect to the axial direction of the housing as described above, the results in the installation space for the capacitors becoming relatively larger in the axial direction of the housing. There is thus room for improvement in such pump device from the viewpoint of efficient disposition of capacitors in electrical noise suppression device.

There is a tendency recently to even further reduce the installation space for an electrical noise suppression device under demand for more compact pump device. Electrical elements configuring the electrical noise suppression device, such as capacitors, are accordingly disposed closer to each other. Moreover, in an electrical noise suppression device, a configuration can be adopted, for example, with a terminal member as a common earth contact by connecting earth terminals of plural electrical elements to the terminal member connected to ground. In such a case, plural press-fit grooves are formed to the terminal member, into which the earth terminals are press-fit connected.

However, if electrical elements are disposed closer to each other, in the terminal member, there is concern about being able to achieve a good press-fit of earth terminals due to adjacent press-fit grooves being disposed in the vicinity of each other. Namely, when press-fitting earth terminals into press-fit grooves, the terminal member displaces (deforms) such that the press-fit groove spreads out to the outsides in the groove width direction. In other words, the terminal member would displace (deform) such that this press-fit groove spreads toward the adjacent press-fit groove side. As a result, the groove width of the adjacent press-fit groove would get smaller, making it difficult to press-fit connect the terminal of an electrical element to the adjacent press-fit groove.

SUMMARY

In consideration of the above circumstances, a pump device capable of disposing a first electrical element and a second electrical element in a noise suppression device with good efficiency is provided, and a terminal member capable of achieving good connection for plural terminals is provided, and a pump device provided with a noise suppression device using such a terminal member is provided.

A pump device of an aspect includes: a housing formed in a tubular shape, that includes: a motor housing section that houses a motor, and a pump chamber that houses an impeller which is axially supported at a rotation shaft of the motor so as to be capable of rotating integrally with the rotation shaft; a cap that includes a power supply terminal for connecting to an external connector and that closes an opening of the motor housing section; a noise suppression device that is provided between the cap and the motor, that is connected between the power supply terminal and the motor, and that suppresses noise from being generated during driving of the motor; a first electrical element that configures the noise suppression device, that is disposed such that a height direction of the first electrical element is oriented along an orthogonal direction orthogonal to an axial direction of the housing, and that includes a pair of first terminals that extend from one end portion of a first element body of the first electrical element toward one side in the orthogonal direction; and a second electrical element that configures the noise suppression device, that is disposed such that a height direction of the second electrical element is oriented along the orthogonal direction, and that includes a pair of second terminals that extend from one end portion of a second element body of the second electrical element toward another side in the orthogonal direction, wherein one of the second terminals is disposed between the pair of first terminals as viewed along the axial direction of the housing.

According to thus configured pump device, the housing formed in the tubular shape includes the motor housing section and the pump chamber. The motor is housed in the motor housing section, and the opening of the motor housing section is closed off with the cap. The impeller is housed in the pump chamber, and is axially supported so as to be capable of rotating as one with the rotation shaft of the motor. Moreover, the noise suppression device is provided between the cap and the motor, and is configured including the first electrical element and the second electrical element. The noise suppression device is electrically connected between the power supply terminal provided at the cap and the motor, such that noise is suppressed from being generated during driving of the motor by the noise suppression device.

The first electrical element and the second electrical element are disposed with their height directions oriented along the orthogonal direction which is orthogonal to the axial direction of the housing. Namely, the first electrical element and the second electrical element are disposed in a state of lying down so as to be orthogonal to the axial direction of the housing. This thereby enables the installation space for the first electrical element and the second electrical element to be suppressed from becoming too large in the axial direction of the housing.

The pair of first terminals of the first electrical element extend from the one end portion of the element body of the first electrical element toward the one side in the orthogonal direction, and the pair of second terminals of the second electrical element extend from the one end portion of the element body of the second electrical element toward the another side in the orthogonal direction. As viewed along the housing axial direction, one of the second terminals is disposed between the pair of first terminals. In other words, the first terminals and the second terminals are disposed alternately to each other as viewed along the housing axial direction. As a result, the installment space (the arranged surface area) of the first electrical element and the second electrical element as viewed along the housing axial direction can be made smaller than a case in which the first electrical element and the second electrical element are disposed in a row adjacent to each other. Thus in the pump device of the aspect, the first electrical element and the second electrical element can be efficiently disposed (arranged) due to efficient utilization of the space between the pair of first terminals (second terminals) to dispose the second terminal (the first terminal).

In the pump device of another aspect, in addition to the above configuration, the noise suppression device includes a retaining member that retains the first electrical element and the second electrical element, the retaining member including: a base portion on which the first electrical element and the second electrical element are mounted, and a pair of stopper portions that abut the one end portion of the first element body of the first electrical element and the one end portion of the second element body of the second electrical element, respectively.

According the pump device configured as described above, the noise suppression device includes the retaining member, and the first electrical element and the second electrical element are mounted to the base of the retaining member, and are retained by the retaining member.

Moreover, the retaining member includes the pair of stopper portions. The pair of stopper portions respectively abuts portions at the one ends of the element bodies of the first electrical element and the second electrical element.

Thus the position in the orthogonal direction of the first electrical element (the second electrical element) with respect to the retaining member can be set with reference to the one end portion of the element body. This thereby enables, for example, variation to be suppressed in positioning between the terminal member to which the first terminal (second terminal) of the first electrical element (the second electrical element) is connected, and the first terminal (second terminal), enabling stable connection of the first terminal (second terminal) to the terminal member.

In the pump device of another aspect, in addition to the above configuration, the retaining member further includes a pair of biasing portions that are resiliently deformable in the orthogonal direction, that abut another end portion of the first element body of the first electrical element and another end portion of the second element body of the second electrical element, respectively, and that bias the first element body of the first electrical element and the second element body of the second electrical element toward respective sides of the stopper portions.

The retaining member further includes the pair of biasing portions. The biasing portions are configured so as to be resiliently deformable in the orthogonal direction, respectively abut portions at the another ends of the element bodies of the first electrical element and the second electrical element, and bias the element bodies toward the corresponding stopper portion side.

Accordingly, this also enables the position of the first electrical element (second electrical element) in the orthogonal direction with respect to the retaining member to be set with reference to the one end portion of the element body. Accordingly, for example, variation in positioning is suppressed between the terminal member to which the first terminal (second terminal) of the first electrical element (second electrical element) is connected and the first terminal (second terminal), enabling stable connection to be made of the first terminal (second terminal) with the terminal member.

In the pump device of another aspect, in addition to the above configuration, the biasing portions include sloping faces that abut the another end portion of the first element body of the first electrical element and the another end portion of the second element body of the second electrical element, respectively; and the sloping faces are sloped, with respect to the axial direction of the housing, toward respective sides of the first element body of the first electrical element and the second element body of the second electrical element, and toward a base portion.

According to the thus configured pump device, the biasing portions include the sloping faces, and the sloping faces abut the another end portions of the element bodies of the first electrical element and second electrical element, respectively. The sloping faces are sloped, with respect to the axial direction of the housing, toward the respective element body sides and the base portion side. Thus biasing forces from the biasing portions can be made to act on the element bodies of the first electrical element and the second electrical element toward the base portion side. This thereby enables the retention performance to be improved of the retaining member with respect to the first electrical element and the second electrical element.

In the pump device of another aspect, in addition to the above configuration, the retaining member is formed from resin, and the base portion and the biasing portions are integrally formed.

According to the pump device configured as described above, the retaining member that retains the first electrical element and the second electrical element can be simply configured due to the retaining member being made from resin, and the base portion and the biasing portions being integrally formed.

In the pump device of another aspect, in addition to the above configuration, the first electrical element and the second electrical element are respectively a first capacitor and a second capacitor.

In the pump device of another aspect, in addition to the above configuration, the noise suppression device includes a pair of choke coils and a third electrical element (third capacitor) in addition to the first electrical element (first capacitor) and the second electrical element (second capacitor); the choke coils are disposed between the first electrical element and the second electrical element in a circumferential direction of the housing; and the third electrical element is disposed between the pair of choke coils as viewed along the axial direction of the housing, and the third electrical element is disposed so as to overlap with the first electrical element and the second electrical element in the axial direction of the housing.

According to the pump device configured as described above, the noise suppression device includes the pair of choke coils and the third electrical element in addition to the first electrical element and the second electrical element. The choke coils are disposed, in the circumferential direction of the housing, between the first electrical element and the second electrical element. This thereby enables efficient arrangement of the first electrical element, the second electrical element, and the pair of choke coils in the noise suppression device.

Moreover, the third electrical element is disposed between the pair of choke coils as viewed along the axial direction of the housing, and the third electrical element is disposed so as to overlap with the first electrical element and the second electrical element in the housing axial direction. This thereby enables the third electrical element to be mounted to the noise suppression device, while suppressing the noise suppression device from becoming larger in the radial direction of the housing.

A terminal member of an aspect includes: a plurality of connection tabs that are configured from a metal plate member, the connection tabs being disposed adjacently in a plate thickness direction thereof; a coupling portion that couples the connection tabs; press-fit grooves that are formed at the respective connection tabs such that the press-fit grooves are disposed so as to be displaced from each other in width direction of the connection tabs, terminals of electrical elements being press-fitted into the press-fit grooves respectively; and insertion grooves that are respectively formed at the connection tabs, the insertion grooves being disposed adjacent to the press-fit grooves in the width direction of the connection tabs, and a terminal of the electrical element that is press-fitted into the press-fit groove of another connection tab being inserted in the insertion groove.

More specifically, the terminal member of the aspect includes: a plurality of connection tabs that are configured from a metal plate member, the connection tabs being disposed adjacently in a plate thickness direction thereof; a coupling portion that couples the connection tabs; first and second press-fit grooves that are formed at the respective connection tabs such that the first and the second press-fit grooves are disposed so as to be displaced from each other in a width direction of the connection tabs, terminals of electrical elements being press-fitted into the first and the second press-fit grooves respectively; and first and second insertion grooves that are formed at the respective connection tabs such that the first and the second insertion grooves are disposed so as to be displaced from each other in the width direction, wherein at one of the connection tabs, the first insertion groove is disposed adjacent to the second press-fit groove in the width direction, at another one of the connection tabs, the second insertion groove is disposed adjacent to the first press-fit groove in the width direction, one of the terminals of the electrical elements, which is press-fitted into the first press-fit groove, is inserted in the first insertion groove, and another one the terminals of the electrical elements, which is press-fitted into the second press-fit groove, is inserted in the second insertion groove.

In the terminal member of the above configuration, the plural connection tabs configured from the metal plate member are coupled by the coupling portion and disposed in a row in the plate thickness direction. The press-fit groove for press-fitting the terminal of the electrical element is formed to each of the connection tabs, and the press-fit grooves are disposed so as to be displaced from each other in the width direction of the connection tabs. Moreover, an insertion groove is formed to each of the connection tabs, and the insertion groove is disposed adjacent to the press-fit groove in the width direction of the connection tab. The terminal of the electrical element that has been press-fitted into the press-fit groove of another connection tab is inserted into the insertion groove.

Therefore, in each of the connection tabs, displacement (deformation) of the connection tab arising when the terminal is press-fitted into the press-fit groove can be absorbed in the insertion groove, helping or enabling to prevent change in the groove width dimension of another press-fit groove due to such displacement (deformation). Accordingly, good connection of plural terminals to the terminal member can be achieved.

In the terminal member of another aspect, in addition to the above configuration, the terminals of the electrical elements press-fitted into the (first and second) press-fit grooves are earth terminals.

According to the thus configured terminal member, the terminal member can be configured as a common earth terminal member for plural electrical elements.

In the terminal member of another aspect, in addition to the above configuration, the coupling portion is disposed at outer sides in the width direction with respect to the (first and second) press-fit grooves and the (first and second) insertion grooves.

According to the thus configured terminal member, due to the coupling portion being disposed at the width direction outsides of the connection tabs with respect to the press-fit grooves and the insertion grooves, further helping or enabling to prevent change in the groove width dimension of another press-fit groove when a terminal is press-fitted into the press-fit groove.

In the terminal member of another aspect, in addition to the above configuration, the coupling portion is a bent portion at which the metal plate member is bent.

According to the thus configured terminal member, due to the coupling portion being configured by the bent portion, the plural connection tabs can be formed at the connection portion by bending processing of a single plate member. This thereby enables easier configuration of the terminal member than, for example, a case in which the connection tabs are coupled such as by welding, enabling an increase in cost of the terminal member to be suppressed.

In the terminal member of another aspect, in addition to the above configuration, in an expanded state of the connection tabs, which is a state of the metal plate member not being bent, the (first and second) press-fit groove and the (first and second) insertion groove are disposed at positions that are symmetrical about a bend line of the bent portion.

According to the thus configured terminal member, due to the press-fit grooves and the insertion grooves being disposed in the expanded state of the connection tabs at positions that are symmetrical to each other about the bend line of the bent portion, a configuration can be achieved in which the press-fit grooves and the insertion grooves are easily corresponded to (aligned with) each other.

In the terminal member of another aspect, in addition to the above configuration: a first taper portion is formed at an opening portion of the first (second) press-fit groove so as to open out toward an outer side in a groove width direction of the first (second) press-fit groove on progression toward an opening side of the first (second) press-fit groove; a second taper portion is formed at an opening portion of the first (second) insertion groove so as to open out toward an outer side in a groove width direction of the first (second) insertion groove on progression toward an opening side of the first (second) insertion groove; and in the expanded state of the connection tabs, the first taper portion and the second taper portion are disposed at positions symmetrical to each other about the bend line of the bent portion.

According to the thus configured terminal member, due to the first taper portion and the second taper portion being disposed at positions symmetrical to each other about the bend line of the bent portion in the expanded state of the connection tabs, a configuration can be achieved in which the first taper portion and the second taper portion are easily corresponded to (aligned with) each other.

In the terminal member of another aspect, in addition to the above configuration, a width dimension of the one of the terminals of the electrical elements is larger than a groove width dimension of the first press-fit groove, and smaller than a groove width dimension of the first insertion groove, and a width dimension of the another one of the terminals of the electrical elements is larger than a groove width dimension of the second press-fit groove, and smaller than a groove width dimension of the second insertion groove.

A pump device of another aspect includes: a housing formed in a tubular shape, that includes: a motor housing section that houses a motor, and a pump chamber that houses an impeller which is axially supported at a rotation shaft of the motor so as to be capable of rotating integrally with the rotation shaft; a cap that includes a power supply terminal for connecting to an external connector and that closes an opening of the motor housing section; and a noise suppression device that includes a terminal member of any one of the above aspects, wherein the noise suppression device is provided between the cap and the motor, is connected between the power supply terminal and the motor, and suppresses noise from being generated during driving of the motor.

According to the thus configured pump device, in the terminal member, a good connection can be achieved of plural terminals due to the noise suppression device being configured including the terminal member configured as described above.

BRIEF DESCRIPTION OF THE DRAWINGS

Embodiments of the invention will be described in detail with reference to the following figures, wherein.

DETAILED DESCRIPTION

Figure 6:
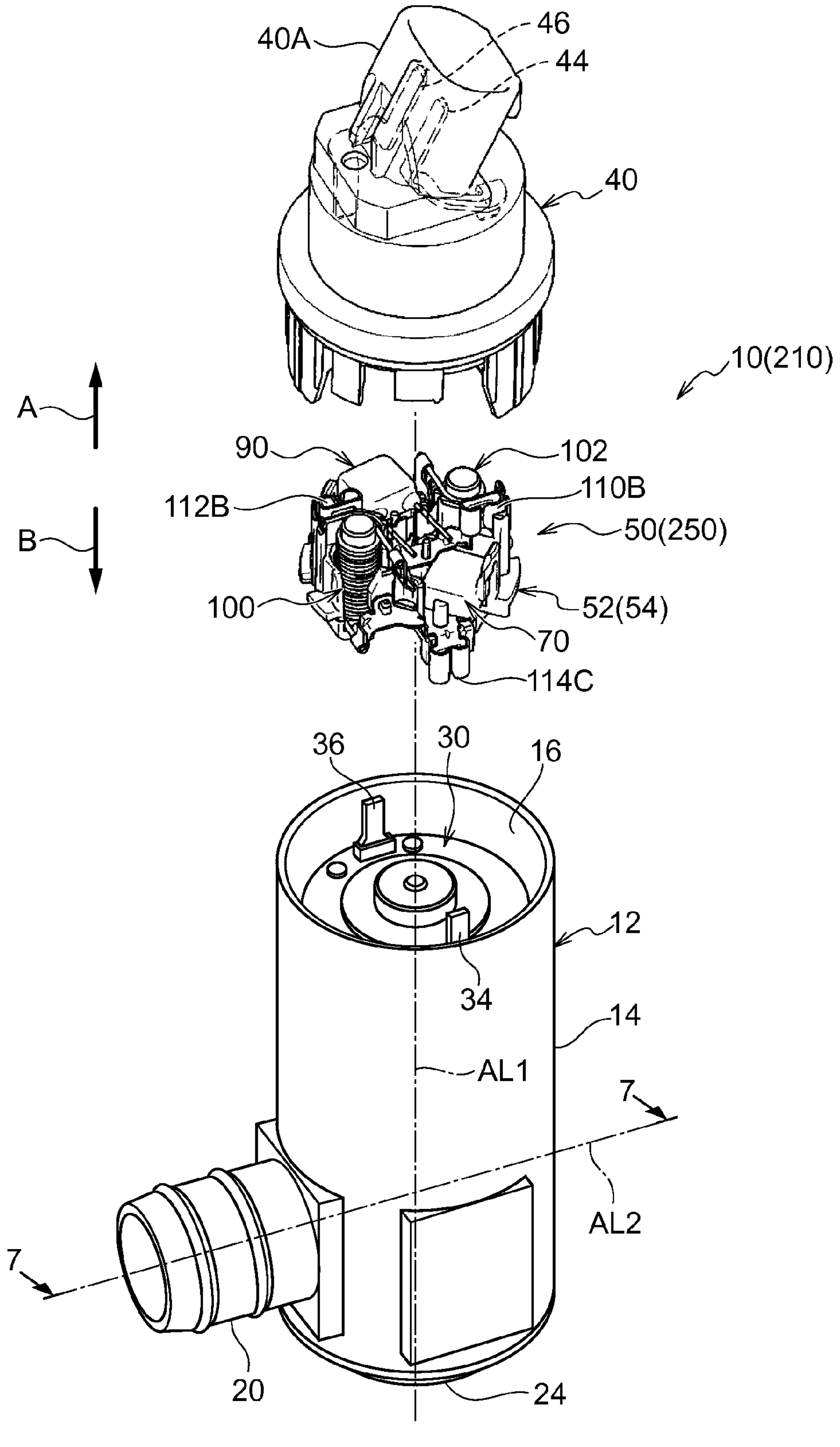
FIG. 6 is an exploded perspective view illustrating a vehicle washer pump device according to the first exemplary embodiment.

Explanation follows regarding a vehicle washer pump device 10 serving as a "pump device" (referred to below as washer pump 10) according to a first exemplary embodiment, with reference to the drawings. The washer pump 10 is configured as a centrifugal pump. The washer pump 10 is assembled to a washer tank (not shown in the drawings) installed inside an engine room (a power unit chamber) of a vehicle (an automobile), in a state in which the up-down direction of the washer pump 10 (the arrow A direction and the arrow B direction in FIG. 6) coincides with (is aligned with) the up-down direction of the vehicle. As illustrated in FIG. 6, the washer pump 10 is configured including a pump body 12, a connector cap 40, and a noise suppression device 50. Explanation follows regarding each configuration.

Pump Body 12

Figure 7:
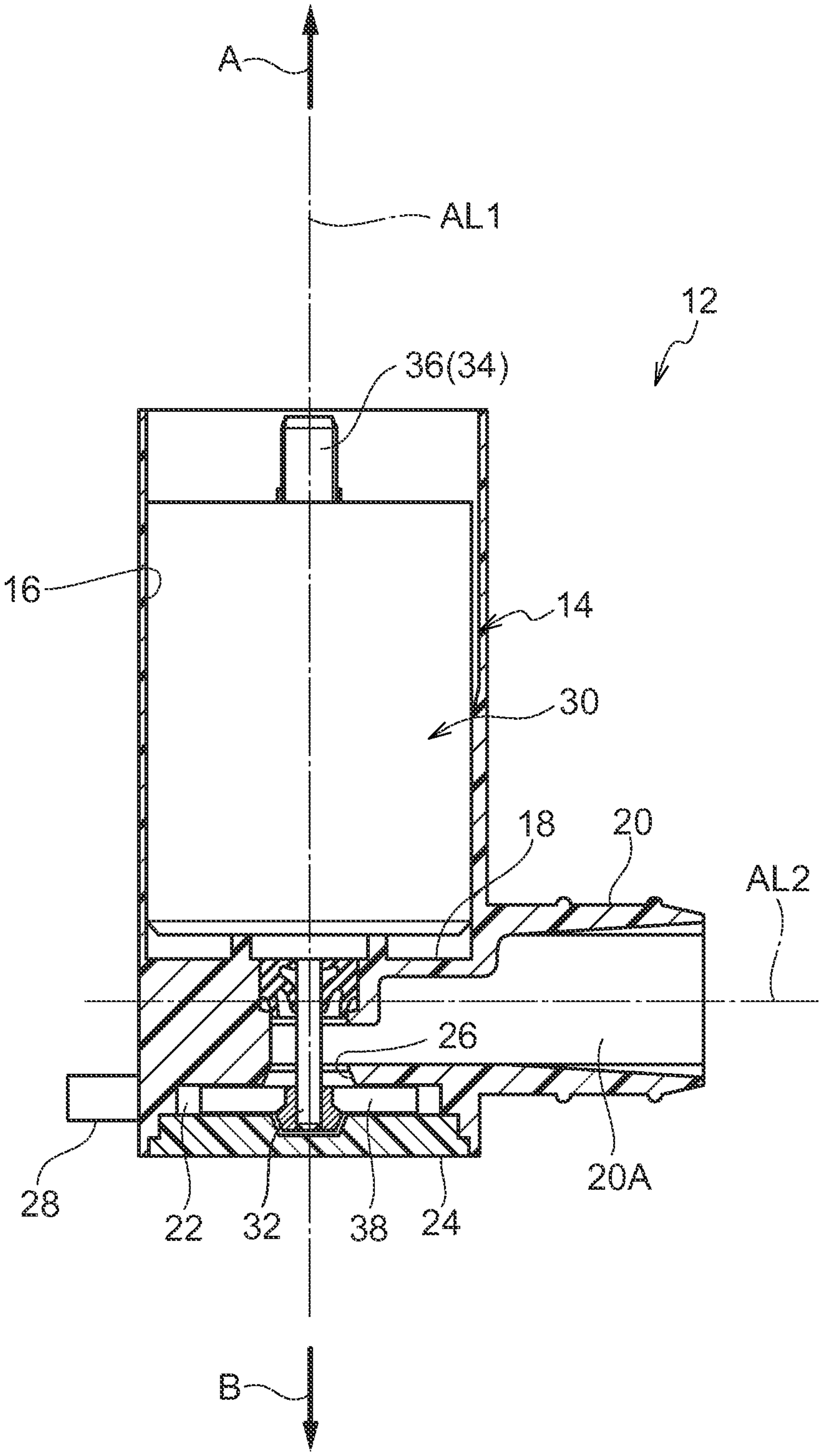
FIG. 7 is a vertical cross-section illustrating the motor body illustrated in FIG. 6 (a cross-section taken along line 7-7 in FIG. 6)

As illustrated in FIG. 7, the pump body 12 is configured including a housing 14, a motor 30, and an impeller 38. The housing 14 is made from resin and formed in a substantially circular cylindrical shape with an axial direction thereof along the up-down direction. The housing 14 is configured including a motor housing section 16, an inlet 20, a pump chamber 22, and an outlet 28.

The motor housing section 16 configures the upper side portion of the housing 14 (the arrow A direction side section of FIG. 7), and is formed in a bottomed, substantially circular cylindrical shape, open toward the upper side. The bottom wall portion of the motor housing section 16 configures a partition wall 18, and the inside of the inlet 20, as described below, and the inside of the motor housing section 16 are partitioned by the partition wall 18. The motor 30 is housed coaxially inside the motor housing section 16, and a rotation shaft 32 of the motor 30 pierces through the partition wall 18, and projects out from the partition wall 18 to the lower side. A sealing member is disposed in a shaft hole portion of the partition wall 18, through which the rotation shaft 32 passes, so as to prevent penetration of washer liquid (liquid) into the motor housing section 16. A pair of motor terminals 34 and 36 (see FIG. 6) are provided at outer circumferential portions on the upper end portion of the motor 30. The motor terminals 34 and 36 are disposed at positions with point symmetry to each other about the axial line of the motor 30, and are formed in substantially rectangular plate shapes that project out to the upper side from the upper end portion of the motor 30 (along the direction of assembly of the connector cap 40 to the housing 14, as described below).

The inlet 20 is disposed at the lower side of the motor housing section 16. The inlet 20 is formed in a substantially circular cylindrical shape, with its axial direction in a direction orthogonal to the axial line AL1 of the housing 14, so as to extend (project) out to the radial direction outside of the housing 14. The internal space of the inlet 20 configures an intake hole 20A, with the intake hole 20A extending as far as the lower side of the motor housing section 16. The housing 14 is assembled to an assembly hole of the washer tank through a grommet (not shown in the drawings) or the like, in a state in which the inlet 20 is inserted into the washer tank.

The pump chamber 22 is disposed at a lower end portion of the housing 14, further to the lower side than the inlet 20. The pump chamber 22 is formed with a substantially circular shaped cross-section, open toward the lower side. An end cap 24 made from resin is fixed in a watertight state to the open portion at the lower end portion of the housing 14 by ultrasonic welding or the like. The pump chamber 22 is thereby closed off by the end cap 24. A communication hole 26 is formed between the pump chamber 22 and the intake hole 20A of the inlet 20. The communication hole 26 is disposed coaxially to the rotation shaft 32 of the motor 30, and communicates the inside of the pump chamber 22 with the inside of the inlet 20 (the intake hole 20A) at a central portion of the pump chamber 22. The rotation shaft 32 of the motor 30 extends through the inside of the inlet 20 and the communication hole 26, through to the pump chamber 22, with the leading end portion of the rotation shaft 32 disposed inside the pump chamber 22.

The impeller 38 is housed inside the pump chamber 22, with the impeller 38 axially supported at the leading end portion of the rotation shaft 32 of the motor 30 so as to be capable of rotating integrally with the rotation shaft 32 of the motor 30. The impeller 38 includes plural vanes, with the vanes extending to the radial direction outside of the rotation shaft 32.

The outlet 28 is formed in a substantially circular cylindrical shape, and extends (projects) from the lower end portion of the housing 14 toward the radial direction outside of the housing 14. More specifically, the outlet 28 projects from the housing 14 toward the opposite side to the side toward which the inlet 20 projects, and is disposed on the axial line AL2 direction of the inlet 20 in plan view. The inside of the outlet 28 is in communication with the inside of the pump chamber 22. The washer liquid in the washer tank is fed under pressure to the outlet 28 when the impeller 38 is rotated to one side in the rotation directions.

The outlet 28 is connected through a hose (not shown in the drawings) to a front nozzle for washing a front windshield (glass) of the vehicle. Configuration is thus made such that when the impeller 38 rotates, the washer liquid in the pump chamber 22 is discharged (jetted) from the outlet 28, so as to be supplied to the front nozzle.

Connector Cap 40

As illustrated in FIG. 6, the connector cap 40 is formed in a bottomed, substantially circular cylindrical shape, open toward the lower side, and is disposed coaxially to the housing 14 at the upper side of the housing 14. The lower end portion of the connector cap 40 is fitted into the opening portion of the motor housing section 16 in the housing 14, and the connector cap 40 is fixed in a watertight state to the housing 14 by ultrasonic welding or the like. The open portion of the motor housing section 16 is thereby closed off by the connector cap 40.

Figure 8A:
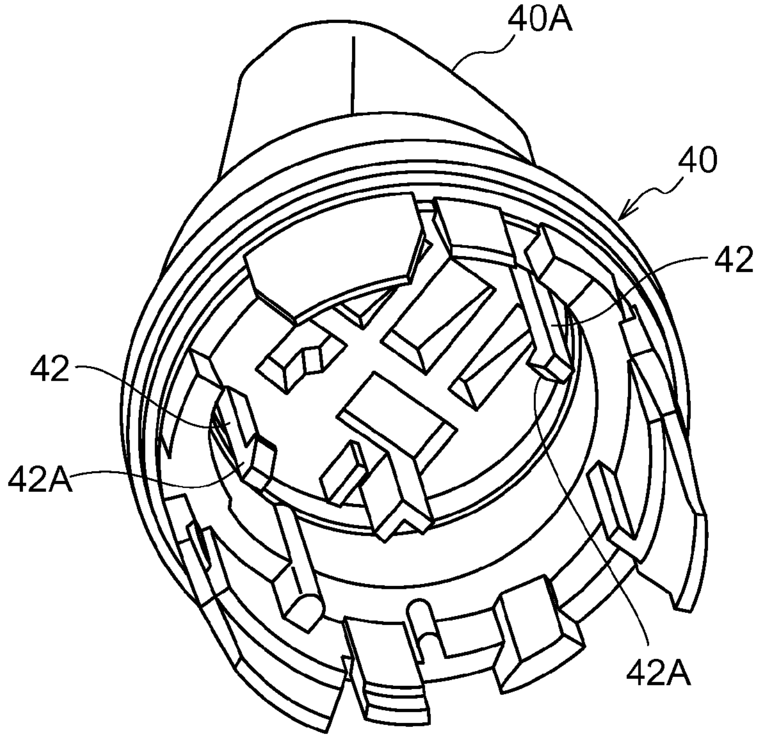
FIG. 8A is a perspective view of the connector cap illustrated in FIG. 6, as viewed from the lower side, and 8B is a perspective view of a state in which a noise suppression device is housed inside the connector cap illustrated in FIG. 8A, as viewed from the lower side.

As illustrated in FIG. 8A, a pair of fixing tabs 42 are integrally formed to the connector cap 40, for fixing the noise suppression device 50, as described below. The fixing tabs 42 extend from an upper wall of the connector cap 40 toward the lower side, and fixing hooks 42A are formed to the leading end portions of the fixing tabs 42.

As illustrated in FIG. 6, a connector section 40A is integrally formed to the connector cap 40. The connector section 40A is formed in a substantially rectangular tubular shape projecting from the upper wall of the connector cap 40 to the upper side. More specifically, the connector section 40A slopes toward the opposite side to the side toward which the inlet 20 projects on progression toward the upper side as viewed from the side.

A pair of power supply terminals 44 and 46 are integrally provided to the connector cap 40. The power supply terminals 44 and 46 are configured by conductive metal plate members, and are formed in substantially rectangular (longitudinal) shapes. Portions at one end of the power supply terminal 44 and 46 are disposed inside the connector section 40A. The power supply terminals 44 and 46 are each bent into a specific shape, with portions at another end of the power supply terminals 44 and 46 projecting out from the upper wall of the connector cap 40 toward the lower side. The another end portions of the power supply terminals 44 and 46 are connected to the motor terminals 34 and 36 of the motor 30 through the noise suppression device 50, as described below. Configuration is thereby adopted such that current is supplied to the motor 30 by connecting external connectors (not shown in the drawings) of a harness on the vehicle side to the connector section 40A.

Noise Suppression Device 50

As illustrated in FIG. 6, the noise suppression device 50 is disposed between the motor 30 and the connector cap 40, in a configuration such that electrical connection is made between the motor terminals 34 and 36 of the motor 30 and the power supply terminals 44 and 46 of the connector section 40A. Thus noise generated while driving the motor 30 is suppressed by the noise suppression device 50.

Figure 2:
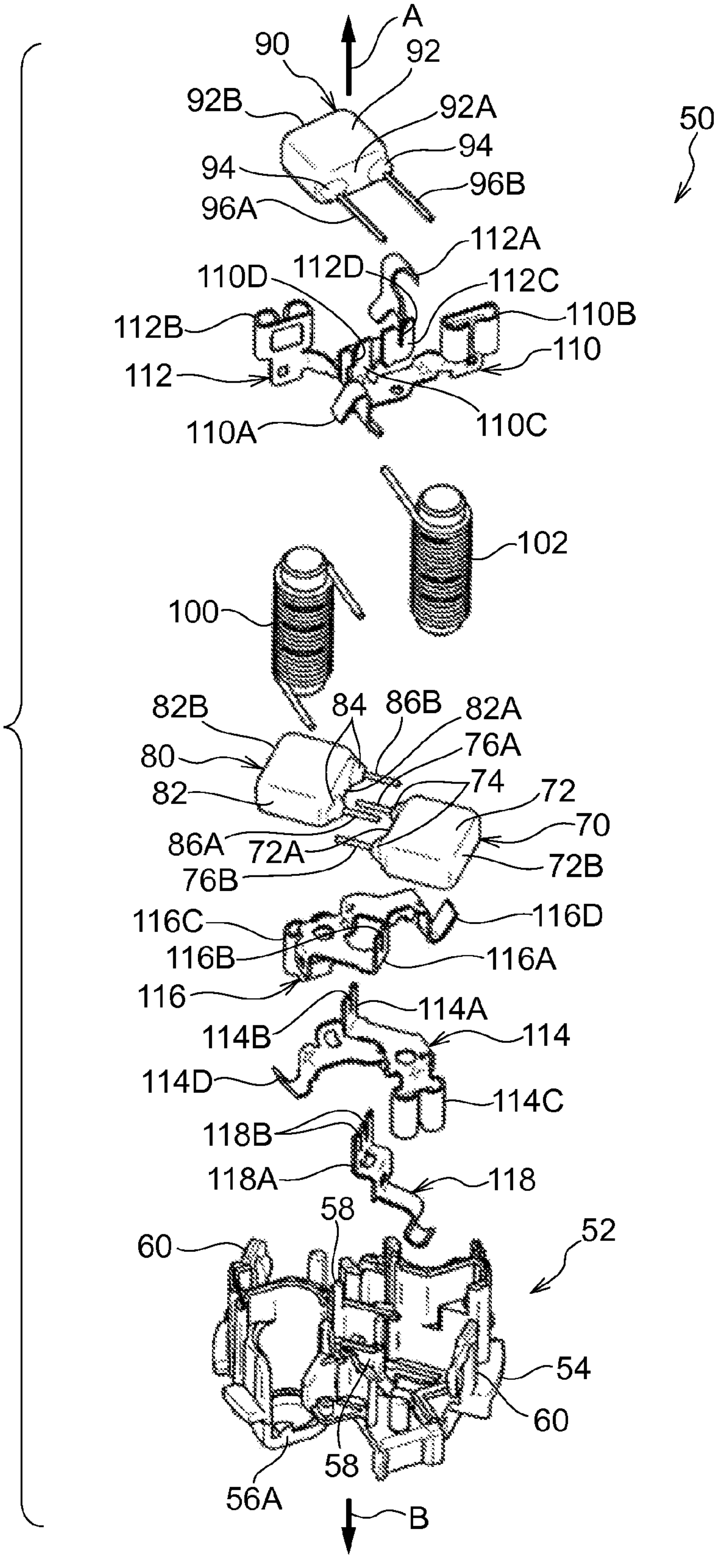
FIG. 2 is an exploded perspective view illustrating a noise suppression device employed in a vehicle washer pump device according to the first exemplary embodiment.

As illustrated in FIG. 2, the noise suppression device 50 includes three capacitors that absorb noise arising during driving of the motor 30 (a first capacitor 70, a second capacitor 80, and a third capacitor 90 that are each radial lead type capacitors, and are each corresponds to "electrical element" in the aspects), and a pair of choke coils (a first choke coil 100 and a second choke coil 102). The noise suppression device 50 also includes a pair of power supply side relay and 112, a pair of motor side relay terminal members 114 and 116 (elements that are broadly defined as "relay terminals"), and an earth terminal member (a ground terminal member) 118 (elements that is broadly defined as a "relay terminal"). These components configuring the noise suppression device 50 are retained by a holder 52 serving as a "retaining member". Explanation first follows regarding the electrical connection relationship between the components configuring the noise suppression device 50, and then regarding each of the components.

Figure 3:
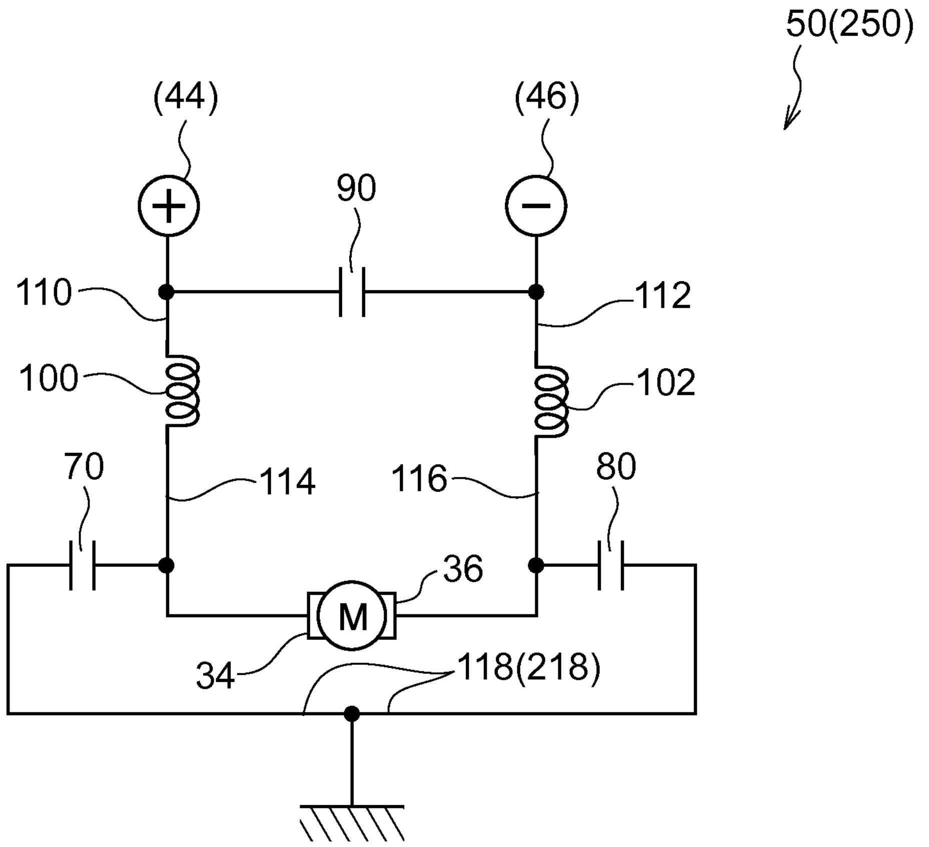
FIG. 3 is an explanatory diagram to explain an electrical connection relationship of components configuring the noise suppression device illustrated in FIG. 2.

As illustrated in FIG. 3, in the noise suppression device 50, one end of the first choke coil 100 is connected to the power supply terminal 44 by the power supply side relay terminal member 110, and one end of the second choke coil 102 is connected to the power supply terminal 46 by the power supply side relay terminal member 112.

Another end of the first choke coil 100 is connected to the motor terminal 34 of the motor 30 and to one end of the first capacitor 70 by the motor side relay terminal member 114. Another end of the second choke coil 102 is connected to the motor terminal 36 of the motor 30 and to one end of the second capacitor 80 by the motor side relay terminal member 116. The first choke coil 100 and the second choke coil 102 are thereby connected in series to the positive electrode side and the negative electrode side of the motor 30, respectively. Another end of the first capacitor 70 and another end of the second capacitor 80 are connected to ground by the earth terminal member 118. The third capacitor 90 is connected to the power supply side relay terminal members 110 and 112 so as to be connected in parallel to the motor 30.

Figure 1:
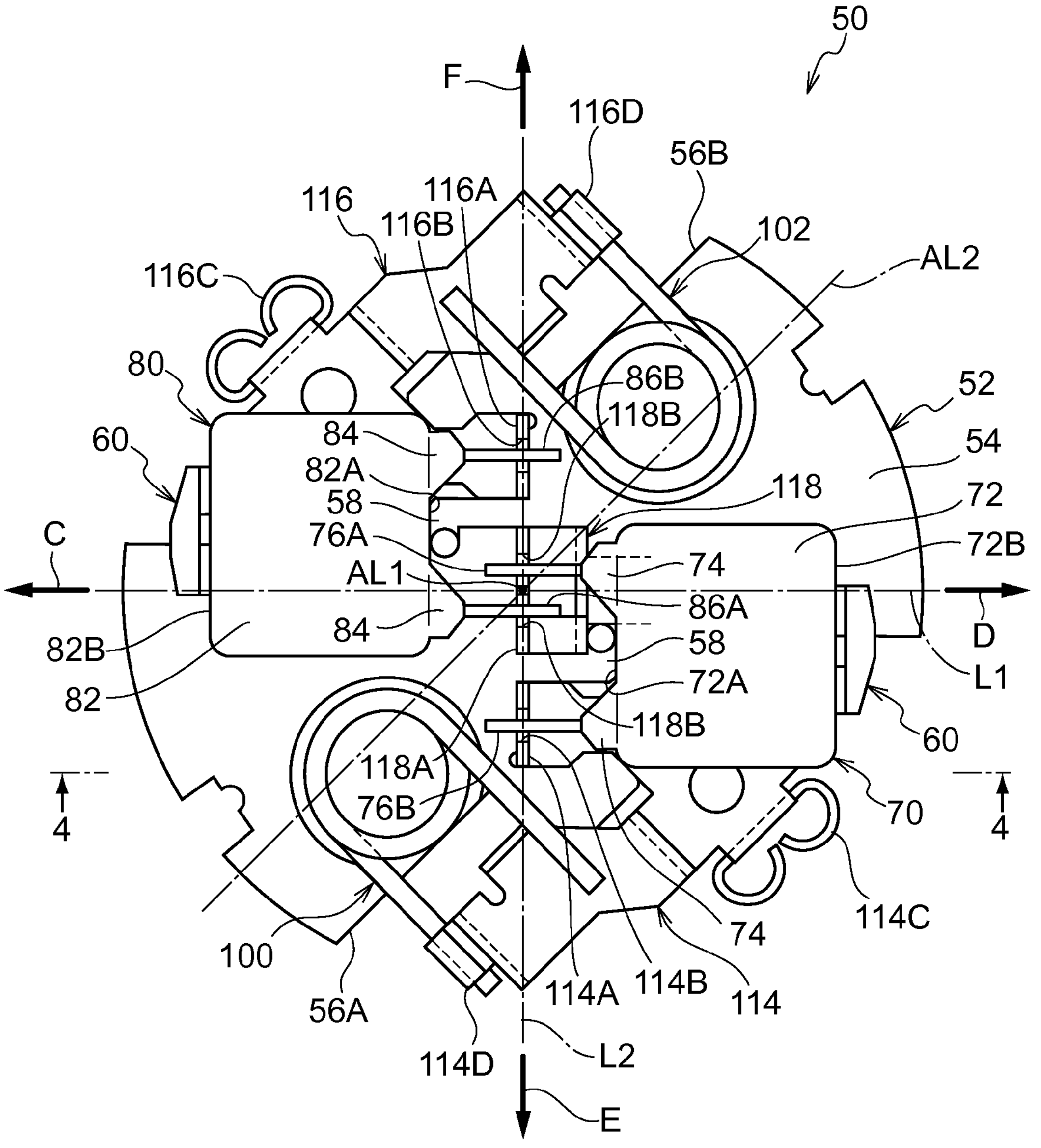
FIG. 1 is a plan view illustrating the arrangement relationship between a first capacitor and a second capacitor of a noise suppression device employed in a vehicle washer pump device according to a first exemplary embodiment.

As illustrated in FIG. 1, the holder 52 is made from resin. The holder 52 includes a substantially circular plate shaped base portion 54. The base portion 54 is disposed with its plate thickness direction along the up-down direction, and is disposed coaxially to the housing 14 and the connector cap 40.

In the following explanation, for ease of explanation, in plan view, a line rotated by 45 degrees in the clockwise direction from the axial line AL2 of the inlet 20 about the axial line of the base portion 54 (namely the axial line AL1 of the housing 14) is referred to as a first reference line L1, and a line passing through the axial line AL1 of the base portion 54 and orthogonal to the first reference line L1 is referred to as a second reference line L2. The direction along the first reference line L1 is referred to as a first direction, one side in the first direction (one side in orthogonal direction in the aspects) refers to the arrow C direction side, and another side in the first direction (another side in the orthogonal direction in the aspects) refers to the arrow D direction side. The direction along the second reference line L2 is referred to as a second direction, one side in the second direction refers to the arrow E direction side, and another side in the second direction refers to the arrow F direction side.

Figure 8B:
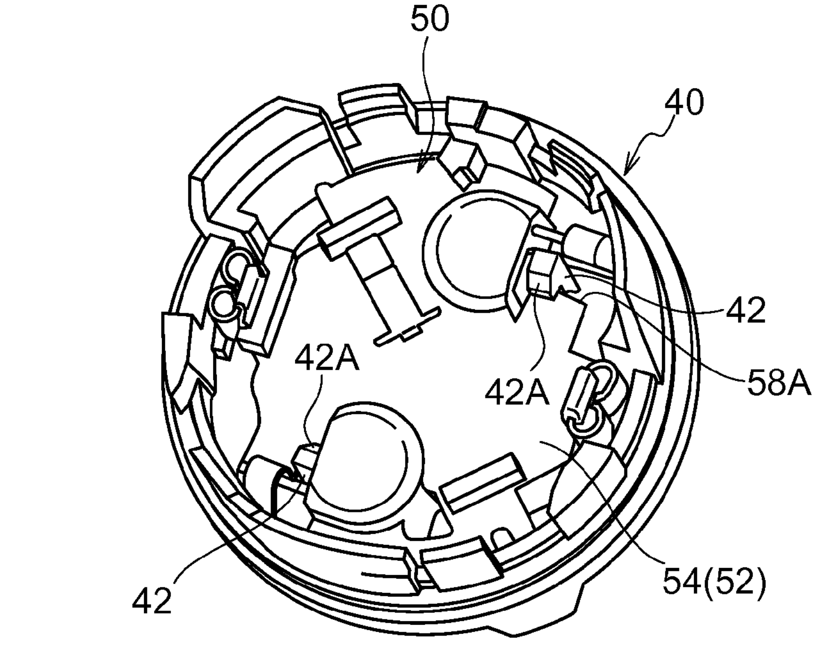

A pair of notches 56A and 56B are formed to outer circumferential portions of the base portion 54. The notches 56A and 56B are disposed at positions with point symmetry to each other about the axial line AL1, as reference, of the base portion 54. The notch 56A is disposed so as to be adjacent with respect to the second reference line L2 at the first direction one side, and the notch 56B is disposed so as to be adjacent with respect to the second reference line L2 at the first direction another side. The notches 56A and 56B are formed with substantially V-shaped profiles, open toward the radial direction outside of the base portion 54. The fixing hooks 42A of the fixing tabs 42 of the connector cap 40 anchor onto the edge portions of the notches 56A and 56B. Thereby not only are the power supply side relay terminal members 110 and 112 being connected to the power supply terminals 44 and 46, but the holder 52 is also fixed to the connector cap 40 (see FIG. 8B), and the noise suppression device 50 is housed inside the connector cap 40.

The first capacitor 70 is mounted to the upper face of the base portion 54. The first capacitor 70 includes a first element body 72 serving as an "element body" formed with a substantially rectangular cuboid shape, and the first element body 72 is disposed with its height direction along the first direction. Namely, the first capacitor 70 is disposed in a lying down state, lying in the direction orthogonal to the axial direction of the housing 14. The first element body 72 is disposed with its thickness direction in the up-down direction, and with its width direction along the second direction, at the first direction another side with respect to the second reference line L2. The width direction center of the first element body 72 is disposed so as to be displaced to the one side in the second direction with respect to the first reference line L1, and with a portion of the first element body 72 overlapping with the first reference line L1 in plan view.

A pair of bulging portions 74 are formed to both width direction side portions of one end portion 72A of the first element body 72. The bulging portions 74 bulge out from the first element body 72 to the first direction one side. The first capacitor 70 also has a pair of first terminals 76A and 76B. The first terminals 76A and 76B extend out from the bulging portions 74 to the first direction one side. The first terminal 76A is disposed at the second direction another side with respect to the first reference line L1, and the first terminal 76B is disposed at the second direction one side with respect to the first reference line L1. The leading end portions of the first terminals 76A and 76B are disposed at the first direction one side with respect to the second reference line L2.

The second capacitor 80 is formed with the same structure as that of the first capacitor 70, and is mounted to the upper face of the base portion 54. Namely, the second capacitor 80 includes a second element body 82 serving as an "element body", a pair of bulging portions 84 which are formed to one end portion 82A of the second element body 82; and a pair of second terminals 86A and 86B that respectively extend out from the bulging portions 84. A portion at another end of the second element body 82 configures an another end portion 82B. The first capacitor 70 and the second capacitor 80 are disposed so as to have point symmetry to each other about the axial line AL1, as reference, of the base portion 54 in plan view. Namely, the second terminal 86A is disposed between the pair of first terminals 76A and 76B of the first capacitor 70, with the first terminals 76A and 76B and the second terminals 86A and 86B disposed alternately to each other along the second direction. The first capacitor 70 and the second capacitor 80 thereby overlap with each other in the first direction and the second direction in plan view.

A pair of stopper portions 58 is formed to the upper face of the base portion 54 as described above, to restrict the positions in the first direction of the first capacitor 70 and the second capacitor 80 with respect to the base portion 54. The stopper portions 58 are respectively disposed between the pair of bulging portions 74 of the first capacitor 70 and between the pair of bulging portions 84 of the second capacitor 80, and respectively abut the one end portion 72A of the first element body 72 and the one end portion 82A of the second element body 82. Movement of the first capacitor 70 to the first direction one side and movement of the first capacitor 70 in the second direction are thereby restricted by the stopper portion 58 abutting the first element body 72. Similarly, movement of the second capacitor 80 to the first direction another side and movement of the second capacitor 80 in the second direction are restricted by the stopper portion 58 abutting the second element body 82.

A pair of engaging tabs 60 are also integrally formed as "biasing portions" at outer circumferential portions of the upper face of the base portion 54. The engaging tabs 60 are formed so as to correspond to the first element body 72 and the second element body 82, respectively, and the pair of engaging tabs 60 is configured so as to have point symmetry to each other about the axial line AL1 of the base portion 54. Thus in the following explanation, explanation will be given regarding the engaging tab 60 corresponding to the first element body 72, and explanation will be omitted regarding the engaging tab 60 corresponding to the second element body 82.

Figure 4:
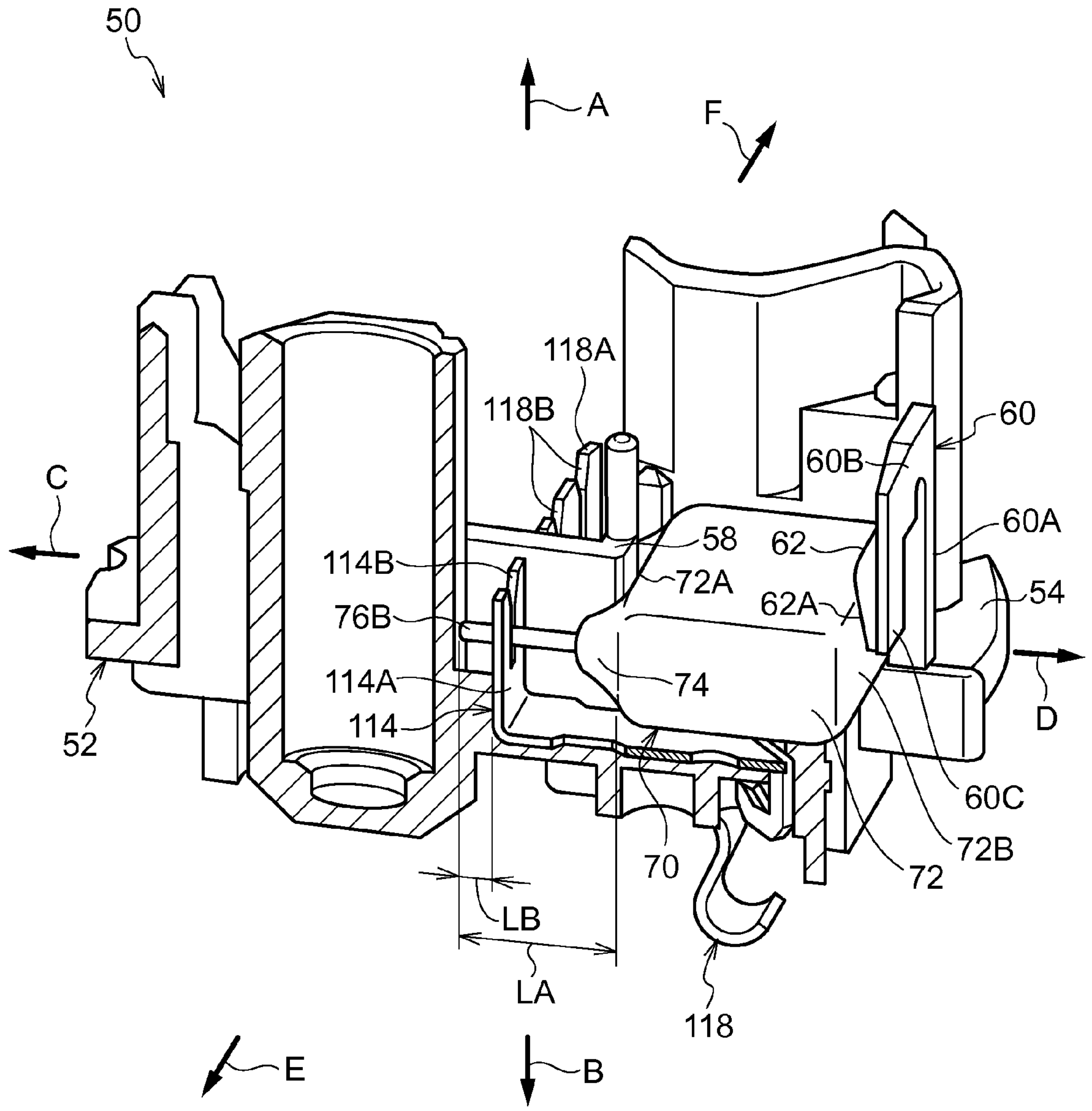
FIG. 4 is a cross-section illustrating a retained state of the first capacitor illustrated in FIG. 1 (cross-section taken along line 4-4 in FIG. 1)

As illustrated in FIG. 4, the engaging tab 60 is disposed on the opposite side of the first element body 72 to that of the stopper portion 58. The engaging tab 60 is formed in a substantially number-7 plate shape, is disposed with the plate thickness direction thereof along the first direction, and extends from the base portion 54 to the upper side. More specifically, the engaging tab 60 is configured including a first arm 60A extending to the upper side from the base portion 54, a second arm 60B extending from the upper end portion of the first arm 60A toward the second direction one side, and a third arm 60C extending from the leading end portion (one end portion in the second direction) of the second arm 60B toward the lower side. The engaging tab 60 is configured so as to be resiliently deformable in the first direction.

An engagement hook 62 is formed to a lower end portion of the third arm 60C. The engagement hook 62 projects out from the third arm 60C to the first direction one side (the first element body 72 side). The engagement hook 62 includes a sloping face 62A, and the sloping face 62A slopes toward the first direction another side (the side in the direction away from the first element body 72) on progression toward the lower side as viewed along the second direction. In other words, the sloping face 62A slopes, with respect to the up-down direction, toward the base portion 54 side and toward the first element body 72 side. The sloping face 62A abuts an another end portion 72B of the first element body 72, and the engaging tab 60 is resiliently deformed to the first direction another side. The first element body 72 is thereby in a state biased to the first direction one side (the stopper portion 58 side) and to the lower side by the engaging tab 60, retaining the first capacitor 70 onto the base portion 54.

As illustrated in FIG. 2, the earth terminal member 118 is configured from a conductive metal plate member, and retained by the base portion 54. The earth terminal member 118 extends in the substantially up-down direction, and a connecting portion 118A is formed to a leading end portion of the earth terminal member 118. As illustrated in FIG. 1, the connecting portion 118A is disposed at the upper side of a central portion of the base portion 54, with its plate thickness direction along the first direction, and is disposed on the second reference line L2 in plan view. A pair of slits 118B is formed to the connecting portion 118A, and the first terminal 76A of the first capacitor 70 and the second terminal 86A of the second capacitor 80 are press-fit connected inside the pair of slits 118B respectively. The lower end portion of the earth terminal member 118 is connected to ground.

As illustrated in FIG. 2, the motor side relay terminal member 114 is configured by a conductive metal plate member, and retained by the base portion 54. The motor side relay terminal member 114 includes a connection portion 114A. As illustrated in FIG. 1, the connection portion 114A is disposed, with its plate thickness direction along the first direction, at a position on the second direction one side with respect to the connecting portion 118A of the earth terminal member 118, and is disposed on the second reference line L2 in plan view. A slit 114B is formed to the connection portion 114A, and the first terminal 76B of the first capacitor 70 is press-fitted connected into the slit 114B. The motor side relay terminal member 114 and the first capacitor 70 are thereby electrically connected together.

Moreover, as illustrated in FIG. 2, the motor side relay terminal member 114 includes a connection portion 114C. The connection portion 114C is disposed at the radial direction outside of the base portion 54, and is bent and curved into a substantially letter B shape in plan view. The motor terminal 34 of the motor 30 is press-fitted connected (plug connected) inside the connection portion 114C. The motor 30 and the motor side relay terminal member 114 are thereby electrically connected together.

The motor side relay terminal member 114 also includes a connection portion 114D. The connection portion 114D is bent into a substantially V-shaped cross-section, open toward the upper side. The connection portion 114D is caulked (crimped) so as to wrap around (so as to grip or hold) the terminal of the first choke coil 100 as described below (see FIG. 1 and FIG. 5).

As illustrated in FIG. 2, the motor side relay terminal member 116 is configured by a conductive metal plate member, and is retained by the base portion 54. The motor side relay terminal member 114 and the motor side relay terminal member 116 are configured so as to have point symmetry to each other about the axial line AL1, as reference, of the base portion 54. Namely, as illustrated in FIG. 1, the motor side relay terminal member 116 includes a connecting portion 116A. The connecting portion 116A is disposed at a position on the second direction another side with respect to the connecting portion 118A of the earth terminal member 118, is disposed with its plate thickness direction along the first direction, and is disposed on the second reference line L2 in plan view. A slit 116B is formed to the connecting portion 116A, and the second terminal 86B of the second capacitor 80 is press-fit connected into the slit 116B. The motor side relay terminal member 116 and the second capacitor 80 are thereby electrically connected together.

As illustrated in FIG. 2, the motor side relay terminal member 116 includes a connection portion 116C, and the motor terminal 36 of the motor 30 is press-fitted connected (plug connected) into the connection portion 116C. The motor 30 and the motor side relay terminal member 116 are thereby electrically connected together. The motor side relay terminal member 116 also includes a connection portion 116D. The connection portion 116D is caulked (crimped) so as to wrap around (so as to grip or hold) the terminal of the second choke coil 102, as described below (see FIG. 1 and FIG. 5).

Figure 5:
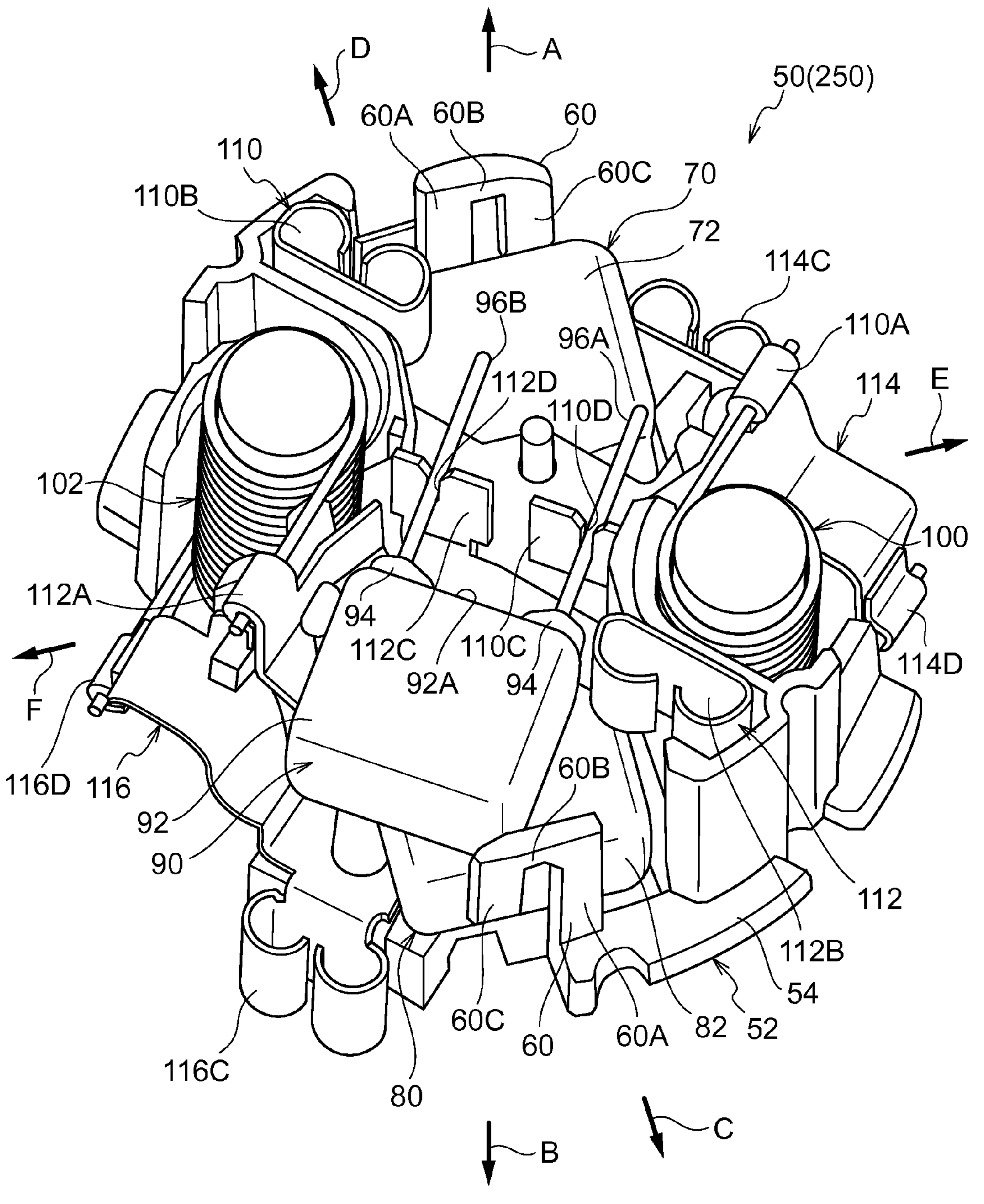
FIG. 5 is an overall perspective view illustrating the noise suppression device illustrated in FIG. 2.

As illustrated in FIG. 1 and FIG. 2, the first choke coil 100 is formed in a substantially circular pillar shape, disposed with its axial direction along the up-down direction. The first choke coil 100 is disposed at the first direction one side with respect to the first capacitor 70 and at the second direction one side with respect to the second capacitor 80, and is retained in the holder 52. As illustrated in FIG. 5, the terminal at a lower end portion of the first choke coil 100 is connected to the connection portion 114D of the motor side relay terminal member 114, and the terminal at an upper end portion of the first choke coil 100 is connected to the power supply side relay terminal member 110, as described below.

As illustrated in FIG. 1 and FIG. 2, the second choke coil 102 is formed in a substantially circular pillar shape, and is disposed with its axial direction along the up-down direction. The second choke coil 102 is disposed at a position with point symmetry to the first choke coil 100 about the axial line AL1, as reference, of the base portion 54 in plan view, and is retained by the holder 52. Namely, the second choke coil 102 is disposed at the second direction another side with respect to the first capacitor 70, and at the first direction another side with respect to the second capacitor 80. The first capacitor 70, the first choke coil 100, the second capacitor 80, and the second choke coil 102 are thereby disposed in a row in the circumferential direction of the base portion 54. As illustrated in FIG. 5, the terminal at the lower end portion of the second choke coil 102 is connected to the connection portion 116D of the motor side relay terminal member 116, and the terminal at the upper end portion of the second choke coil 102 is connected to the power supply side relay terminal member 112, as described below.

As illustrated in FIG. 2, the power supply side relay terminal member 110 is configured by a conductive metal plate member, and is retained by the base portion 54. The power supply side relay terminal member 110 includes a connection portion 110A, and the connection portion 110A is bent into a substantially V-shaped cross-section open toward the lower side. The connection portion 110A is caulked (crimped) so as to wrap around (so as to grip or hold) the terminal at the upper end portion of the first choke coil 100, as described below (see FIG. 5).

The power supply side relay terminal member 110 includes a connection portion 110B, and the connection portion 110B is bent and curved into a substantially B shaped profile in plan view. An another end portion of the power supply terminal 44 is press-fit connected (plug connected) into the connection portion 110B. The power supply terminal 44 is thereby connected to the motor 30 through the power supply side relay terminal member 110, the first choke coil 100, and the motor side relay terminal member 114.

The power supply side relay terminal member 110 also includes a connection portion 110C. As illustrated in FIG. 5, the connection portion 110C is disposed between the first choke coil 100 and the second choke coil 102, and disposed at the upper side of the first capacitor 70 and the second capacitor 80. A slit 110D is formed in the connection portion 110C, and a third terminal 96A of the third capacitor 90 is press-fit connected into the slit 110D, as described below.

As illustrated in FIG. 2, the power supply side relay terminal member 112 is formed from a conductive metal plate member, and is retained by the base portion 54. The power supply side relay terminal member 110 and the power supply side relay terminal member 112 are configured so as to have point symmetry to each other about the axial line AL1, as reference, of the base portion 54. Namely, the power supply side relay terminal member 112 includes a connection portion 112A, and the connection portion 112A is caulked (crimped) so as to wrap around (so as to grip or hold) the terminal at the upper end portion of the second choke coil 102 (see FIG. 5).

The power supply side relay terminal member 112 includes a connection portion 112B, and the power supply terminal 46 is press-fit connected (plug connected) into the connection portion 112B. The power supply terminal 46 is thereby electrically connected to the motor 30 through the power supply side relay terminal member 112, the second choke coil 102, and the motor side relay terminal member 116. Moreover, as illustrated in FIG. 5, the power supply side relay terminal member 112 includes a connection portion 112C, and the connection portion 112C is disposed between the connection portion 110C and the second choke coil 102, and disposed at the upper side of the first capacitor 70 and the second capacitor 80. A slit 112D is formed in the connection portion 112C, and a third terminal 96B of the third capacitor 90 is press-fit connected into the slit 112D, as described below.

As illustrated in FIG. 5, the third capacitor 90 is configured with the same structure as that of the first capacitor 70. Namely, the third capacitor 90 includes a third element body 92 (an element that is broadly defined as an "element body"), a pair of bulging portions 94 that are formed to one end portion 92A of the third element body 92, and the pair of the third terminals 96A and 96B that extend out from the respective bulging portions 94. The third capacitor 90 is disposed between the first choke coil 100 and the second choke coil 102, and is disposed at the upper side of the first capacitor 70 and the second capacitor 80. More specifically, the third element body 92 is disposed at the upper side of the second element body 82. The third terminal 96A of the third capacitor 90 is press-fit connected into the slit 110D of the connection portion 110C of the power supply side relay terminal member 110, and the third terminal 96B of the third capacitor 90 is press-fit connected inside the slit 112D of the connection portion 112C of the power supply side relay terminal member 112.

Explanation next follows regarding the operation and advantageous effects of the present exemplary embodiment.

In the washer pump 10 configured as described above, the power supply terminals 44 and 46 provided at the connector cap 40 are connected to the motor terminals 34 and 36 of the motor 30 through the noise suppression device 50. The noise suppression device 50 is configured including the first capacitor 70 and the second capacitor 80 for absorbing noise arising during driving of the motor 30. The generation of noise during driving of the motor 30 is accordingly suppressed by the noise suppression device 50.

The first capacitor 70 and the second capacitor 80 are disposed such that their height directions are along the first direction. Namely, the first capacitor 70 and the second capacitor 80 are disposed such that their height directions are along a direction orthogonal to the axial direction of the housing 14. This thereby enables the installation space for the first capacitor 70 and the second capacitor 80 to be suppressed from becoming too large in the axial direction of the housing 14.

The pair of the first terminals 76A and 76B of the first capacitor 70 extend out from the first element body 72 toward the first direction one side, and the pair of second terminals 86A and 86B of the second capacitor 80 extend out from the second element body 82 toward the first direction another side. The second terminal 86A is disposed between the pair of first terminals 76A and 76B in plan view, and the first terminal 76A is disposed between the pair of second terminals 86A and 86B in plan view. In other words, the first terminals 76A and 76B and the second terminals 86A and 86B are disposed alternately along the second direction in plan view. This thereby enables the first capacitor 70 and the second capacitor 80 to be disposed so as to overlap with each other in the first direction and in the second direction in plan view. The installation space (disposed surface area in plan view) of the first capacitor 70 and the second capacitor 80 can accordingly be made smaller than, for example, a case in which the first capacitor 70 and the second capacitor 80 are disposed in a row adjacent to each other, such that the first terminals 76A and 76B and the second terminals 86A and 86B extend out in the same direction. Thus in the washer pump 10, the first capacitor 70 and the second capacitor 80 can be efficiently disposed due to the space between the pair of the first terminals 76A and 76B (and the second terminals 86A and 86B) being efficiently utilized to dispose the second terminal 86A (and the first terminal 76A).

The pair of stopper portions 58 are formed at the base portion 54 of the holder 52, and the stopper portions 58 abut the one end portion 72A of the first capacitor 70 and the one end portion 82A of the second capacitor 80, respectively. Moreover, the pair of engaging tabs 60 are formed at the base portion 54, and the pair of engaging tabs 60 respectively abut the another end portion 72B of the first element body 72 and the another end portion 82B of the second element body 82, and resiliently deform in the first directions. The first element body 72 and the second element body 82 are accordingly biased by the pair of engaging tabs 60 toward the stopper portion 58 sides.

This thereby enables the position in the first direction of the first capacitor 70 (of the second capacitor 80) with respect to the holder 52 to be set with the one end portion 72A of the first element body 72 (the one end portion 82A of the second element body 82) acting as a reference. As a result, in the first capacitor 70, variations in the positioning between the first terminals 76A and 76B, and the earth terminal member 118 and the motor side relay terminal member 114, are suppressed, enabling the first terminals 76A and 76B to be stably connected to the earth terminal member 118 and the motor side relay terminal member 114. In the second capacitor 80, variations in the positioning between the second terminals 86A and 86B, and the earth terminal member 118 and the motor side relay terminal member 116, are also suppressed, enabling the second terminals 86A and 86B to be stably connected to the earth terminal member 118 and the motor side relay terminal member 116.

Explanation follows regarding this point, using the first capacitor 70. In the first capacitor 70, generally, the length dimension LA of the first terminals 76A and 76B (see FIG. 4) is prescribed (defined) by the length from the first element body 72. There is some variation (tolerance) in the length dimension LA. Thus, in a case in which the stopper portion 58 is omitted from (is not provided at) the base portion 54, variation would occur in the position of the first element body 72 with respect to the base portion 54 in the first direction, and variation would occur in the length dimension LA of the first terminals 76A and 76B. There is accordingly the possibility that the projection amounts of the leading end portions of the first terminals 76B and 76A, from the connection portion 114A of the motor side relay terminal member 114 and from the connecting portion 118A of the earth terminal member 118, become smaller. As a result, press-fit allowance (margin) LB (see FIG. 4) at the leading end portions of the first terminals 76A and 76B when the first terminals 76A and 76B are being press-fit connected to the connection portion 114A and the connecting portion 118A become smaller, with the concern arising that a good press-fit of the first terminals 76A and 76B into the connection portion 114A and the connecting portion 118A might no longer be achieved.

In contrast thereto, in the present exemplary embodiment as described above, the position in the first direction of the first capacitor 70 with respect to the holder 52 is set with reference to the one end portion 72A of the first element body 72. For the press-fit allowance LB at the leading end portions of the first terminals 76A and 76B, there is accordingly no need to consider variation in the positioning of the first element body 72 with respect to the base portion 54 in the first direction. This thereby enables the projection amounts of the leading end portions of the first terminals 76A and 76B from the connection portion 114A of the motor side relay terminal member 114 and from the connecting portion 118A of the earth terminal member 118 to be secured (insured). As a result, the press-fit allowance LB of the first terminals 76A and 76B is secured (insured) when the first terminals 76A and 76B are press-fit connected to the connection portion 118A and the connecting portion 114A, enabling a good press-fit to be achieved of the first terminals 76A and 76B into the connection portion 114A and the connecting portion 118A.

The another end portion 72B of the first element body 72 (the another end portion 82B of the second element body 82) abuts the sloping face 62A of the engagement hook 62 on the engaging tab 60. The sloping face 62A slopes (inclines), with respect to the up-down direction, toward both the first element body 72 side (the second element body 82 side) and the base portion 54 side. Due thereto, it is possible that, as a component force, a bias force toward the lower side (toward the base portion 54) also acts from the sloping face 62A to the first element body 72 (the second element body 82). This thereby enables improved retaining performance to be achieved of the holder 52 with respect to the first capacitor 70 (the second capacitor 80).

The holder 52 is configured from resin, with the base portion 54 and the pair of engaging tabs 60 being integrally formed thereto. This thereby enables the holder 52 that retains the first capacitor 70 and the second capacitor 80 to have a simple structure.

Moreover, in addition to the first capacitor 70 and the second capacitor 80, the noise suppression device 50 also includes the first choke coil 100, the second choke coil 102, and the third capacitor 90. The first capacitor 70, the first choke coil 100, the second capacitor 80, and the second choke coil 102 are disposed along the circumferential direction of the base portion 54 (the housing 14). This thereby enables efficient arrangement of the first capacitor 70, the first choke coil 100, the second capacitor 80, and the second choke coil 102 to be achieved in the noise suppression device 50.

Moreover, the third capacitor 90 is disposed between the first choke coil 100 and the second choke coil 102, in an arrangement in which the first capacitor 70 and the second capacitor 80 overlap (are superimposed on) the third capacitor 90 each other in the up-down direction within the height range of the choke coil height (the long axial line) direction. This thereby enables the third capacitor 90 to be mounted to the noise suppression device 50, while suppressing the noise suppression device 50 from becoming larger in the radial direction of the housing 14.

The noise suppression device 50 is housed in the connector cap 40 and fixed to the connector cap 40. Due thereto, in a case in which, for example, the noise suppression device 50 is omitted according to specification of the connector cap 40, by modifying the connector cap 40, this specification of the washer pump can be easily handled. In such a situation, the housing 14 can be used as a common component.

Moreover, it is also possible to easily change to a noise suppression device 50 of a different specification by changing the noise suppression device 50, in the connector cap 40, in which the power supply side relay terminal members 110 and 112 are plug-connected to the power supply terminals 44 and 46 of the connector cap 40. Such a case enables not only the housing 14, but also the connector cap 40, to be used as a common component.

In the present exemplary embodiment the stopper portion 58 are integrally formed to the base portion 54 in the noise suppression device 50. Alternatively, the stopper portion 58 and the base portion 54 may be configured as separate bodies. For example, the stopper portion 58 may be configured from metal, and the stopper portion 58 and the base portion 54 then integrated together.

In the present exemplary embodiment the engaging tabs 60 are integrally formed to the base portion 54 in the noise suppression device 50. Alternatively, the engaging tabs 60 and the base portion 54 may be configured as separate bodies. For example, the engaging tabs 60 may be configured from metal, and the engaging tabs 60 and the base portion 54 then integrated together.

In the noise suppression device 50 of the present exemplary embodiment, as described above, in the first capacitor 70, due to the stopper portion 58 abutting the one end portion 72A of the first capacitor 70, the position in the first direction of the first capacitor 70 with respect to the holder 52 is set with reference to the one end portion 72A of the first element body 72, as a result, the press-fit allowance LB of the first terminals 76A and 76B is secured (insured) when the first terminals 76A and 76B are press-fit connected to the connection portion 118A and the connecting portion 114A, enabling a good press-fit to be achieved of the first terminals 76A and 76B into the connection portion 114A and the connecting portion 118A (similar applies to the second capacitor 80). Accordingly, in the noise suppression device 50 of the present exemplary embodiment, configuration can be made without the engaging tabs 60, or with another configuration in place of the engaging tabs 60.

In the present exemplary embodiment, a single outlet 28 is formed to the housing 14, and the washer pump 10 is configured in what is referred to as a single outlet pump. Alternatively, the housing 14 may be formed with a pair of outlets 28, so as to configure the washer pump 10 in what is referred to as a double-outlet pump, with the washer liquid selectively switchable between ejection from the pair of outlets 28 by switching the rotation direction of the motor 30 (the impeller 38).

Explanation follows regarding an earth terminal member (a ground terminal member) 218 serving as a “terminal member” according to a second exemplary embodiment, with reference to the drawings. The earth terminal member 218 is applied to a noise suppression device 250 mounted to a vehicle washer pump device 210 (referred to below as washer pump 210) serving as a “pump device”. The earth terminal member 218 corresponds to the earth terminal member 118 of the first exemplary embodiment, but some parts of the configuration of the earth terminal member 218 are different from that of the earth terminal member 118. The washer pump 210 of the present exemplary embodiment is similar to the washer pump 10 of the first exemplary embodiment, except in the earth terminal member 218 and a part of the configuration relating to the earth terminal member 218. The same reference numerals are appended to locations and portions of the washer pump 210 of the present exemplary embodiment that are the same as those of the washer pump 10 of the first exemplary embodiment, and detailed explanation will be omitted thereof. Explanation follows regarding earth terminal member 218, mainly focusing on the portions that differ from in the washer pump 10 of the first exemplary embodiment.

Figure 10:
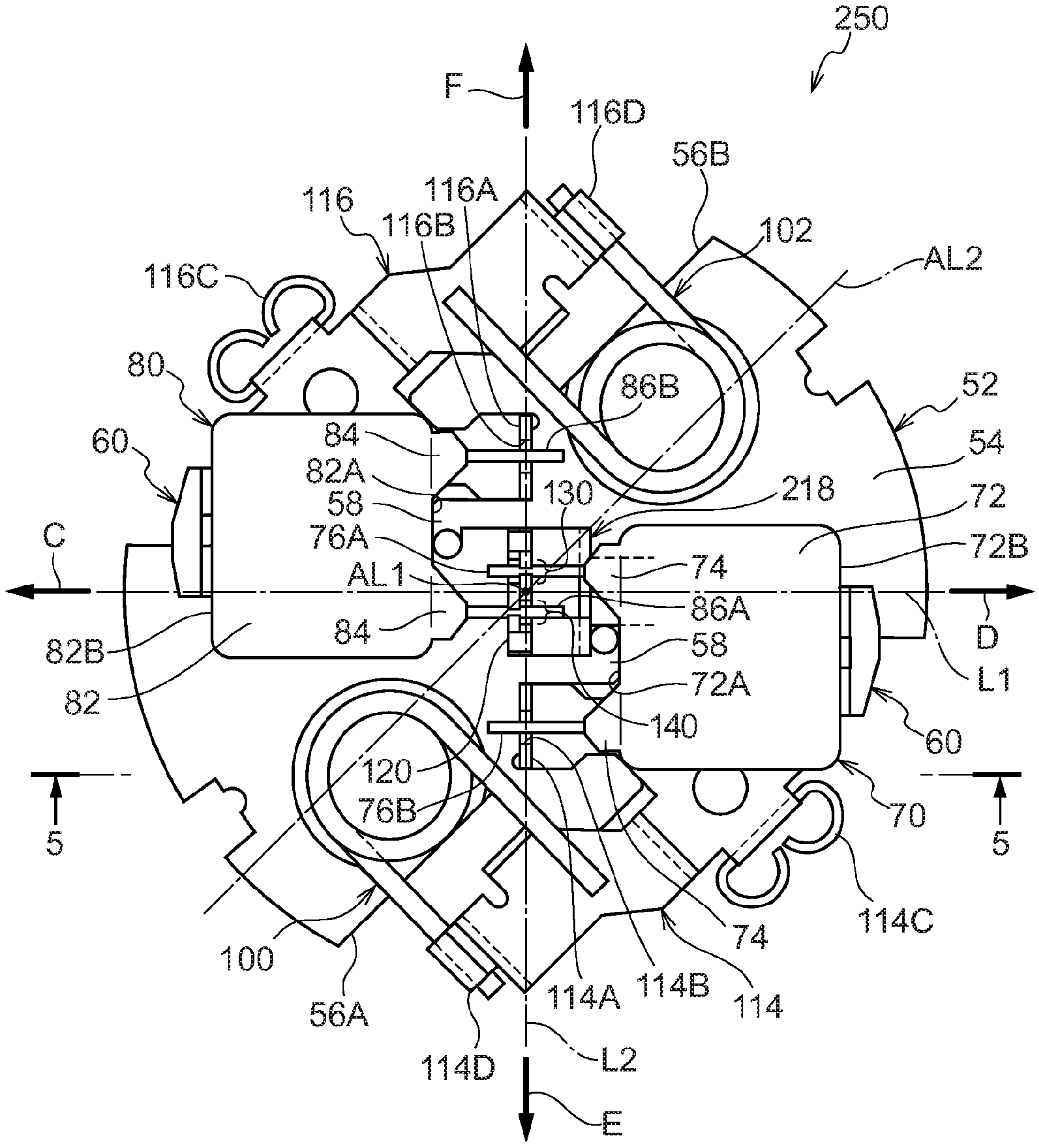
FIG. 10 is a plan view illustrating a noise suppression device applied with the earth terminal member illustrated in FIG. 9, in a state in which a first capacitor and a second capacitor are connected to the earth terminal member.

As illustrated in FIG. 10, in the present exemplary embodiment, the first terminal 76A of the first capacitor 70 is configured as an earth terminal.

Further, the second terminal 86A of the second capacitor 80 is also configured as an earth terminal.

Figure 11:
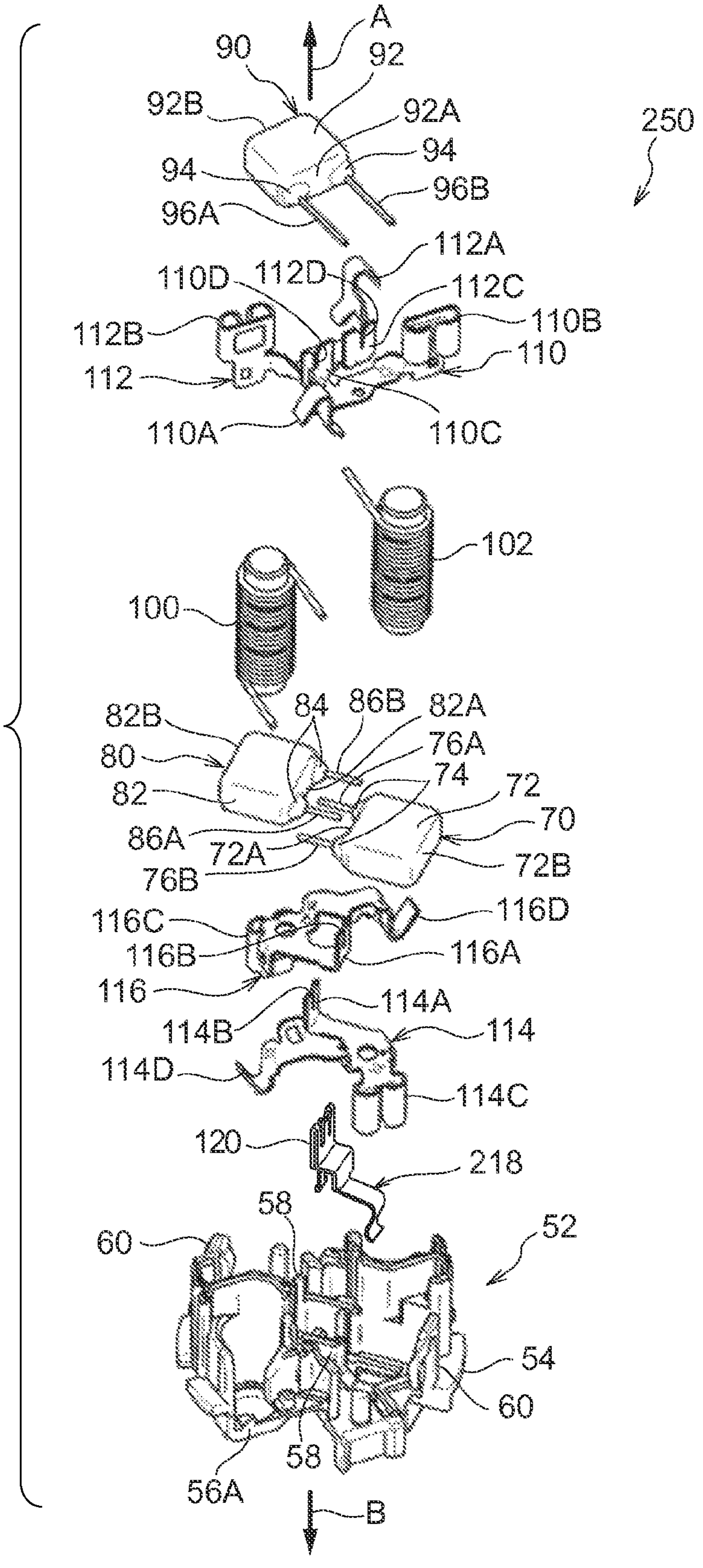
FIG. 11 is an overall exploded perspective view illustrating the noise suppression device illustrated in FIG. 10.
Figure 12:
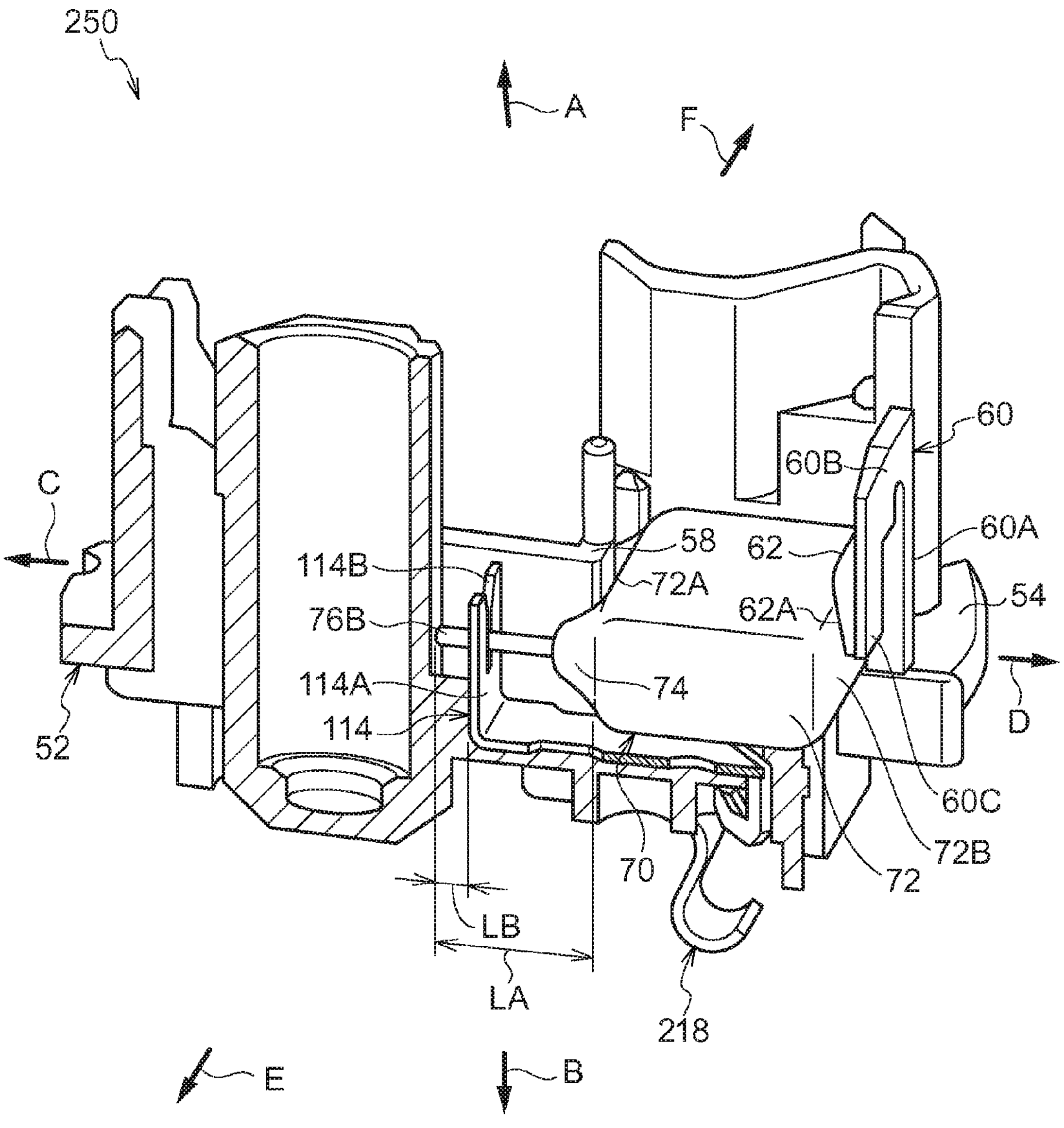
FIG. 12 is a cross-section illustrating a retained state of the first capacitor illustrated in FIG. 10 (a cross-section taken along line 5-5 in FIG. 10)

As illustrated in FIG. 11, the earth terminal member 218 is configured from a conductive metal plate member, and is retained by the base portion 54.

The earth terminal member 218 extends substantially in the up-down direction and in the first direction, and a connection portion 120 is formed at an upper end portion of the earth terminal member 218.

The first terminal 76A of the first capacitor 70 and the second terminal 86A of the second capacitor 80 are connected to the connection portion 120, and the lower end portion of the earth terminal member 218 is connected to ground. Explanation is given below regarding a specific configuration of the earth terminal member 218, and regarding connection of the earth terminal member 218 to the first terminal 76A and the second terminal 86A.

As illustrated in FIG. 10, the connection portion 114A is positioned at the second direction one side with respect to the connection portion 120 of the earth terminal member 218, disposed with its plate thickness direction along the first direction and disposed on the second reference line L2 in plan view.

The connecting portion 116A is positioned at the second direction another side with respect to the connection portion 120 of the earth terminal member 218, disposed with its thickness direction along the first direction, and disposed on the second reference line L2 in plan view.

Earth Terminal Member 218

As illustrated in FIG. 13 and FIG. 14A to FIG. 14C, the earth terminal member 218 is formed by bending processing a plate member which is cut out in an elongated shape of specific profile. Specifically, the connection portion 120 is formed by bending a portion which is at one side in the length direction (the arrow C direction side in FIG. 14A) of the earth terminal member 218 (the above mentioned plate member) back on itself. Namely, the connection portion 120 is configured by two plate tabs side-by-side in the plate thickness direction. A portion at one length direction side of the connection portion 120 configures a first connection tab 120A serving as a “connection tab”, and a portion at another length direction side of the connection portion 120 configures a second connection tab 120B serving as a “connection tab”. The width direction (plate face direction) of the first connection tab 120A and the second connection tab 120B is accordingly coincided with (oriented in) the width direction of the earth terminal member 218. The portion bent over at the upper end portions of each of the first connection tab 120A and the second connection tab 120B configures a bent portion 128. In a state in which the earth terminal member 218 is assembled to the base portion 54, the earth terminal member 218 is disposed with its length direction along the first direction, and the width direction of the earth terminal member 218 is disposed along the second direction. In this state, the width direction central line of the earth terminal member 218 is coincided with (aligned with) the first reference line L1.

Figure 13:
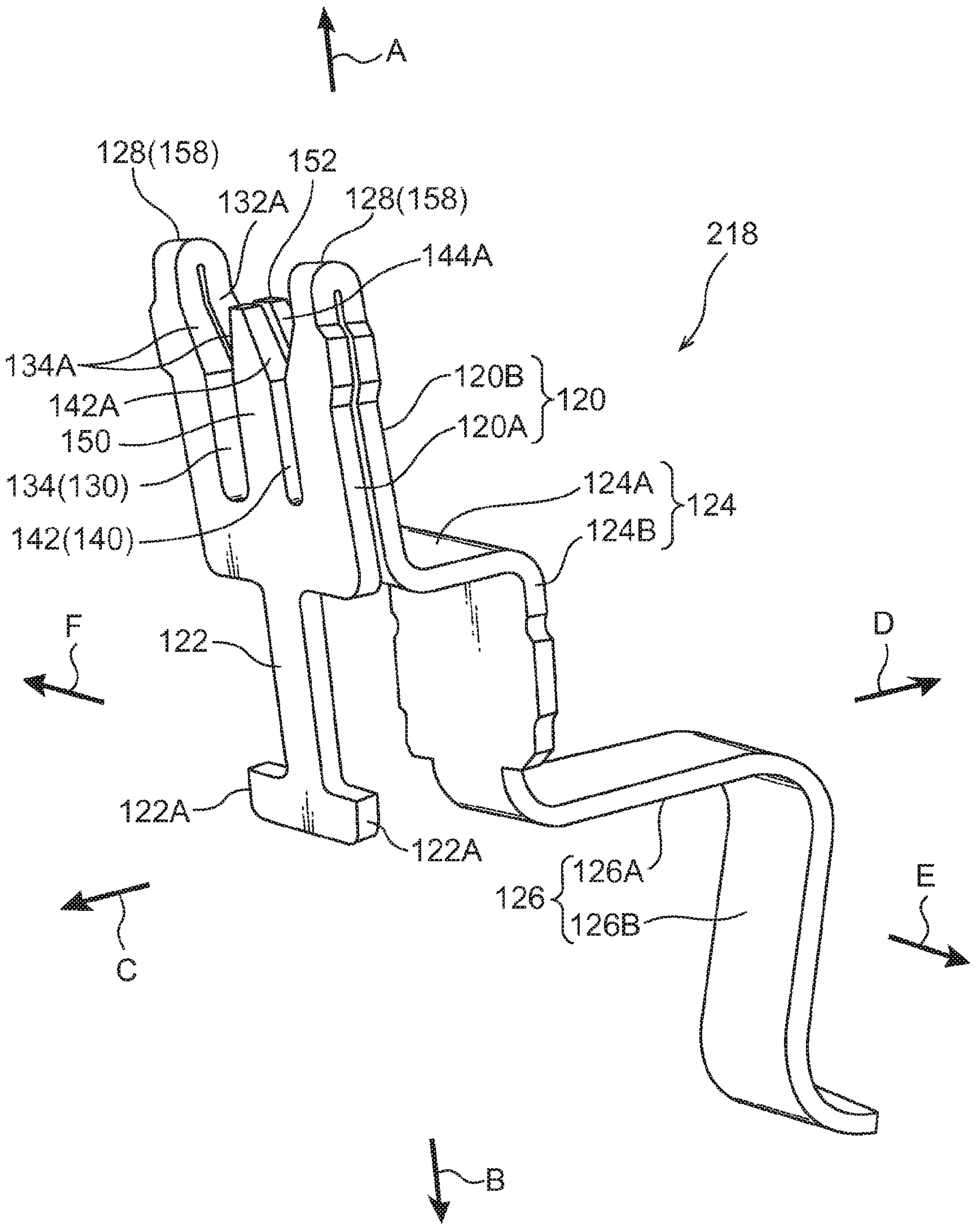
FIG. 13 is an overall perspective view illustrating the earth terminal member illustrated in FIG. 9.

As illustrated in FIG. 13, an anchor tab 122 is integrally formed at a width direction central portion of the lower end portion of the first connection tab 120A. The anchor tab 122 extends toward the lower side from the first connection tab 120A. A pair of hook portions 122A is formed to the leading end portion of the anchor tab 122. The hook portions 122A project out from the anchor tab 122 to the outsides in the width direction of the first connection tab 120A.

Figure 14A:
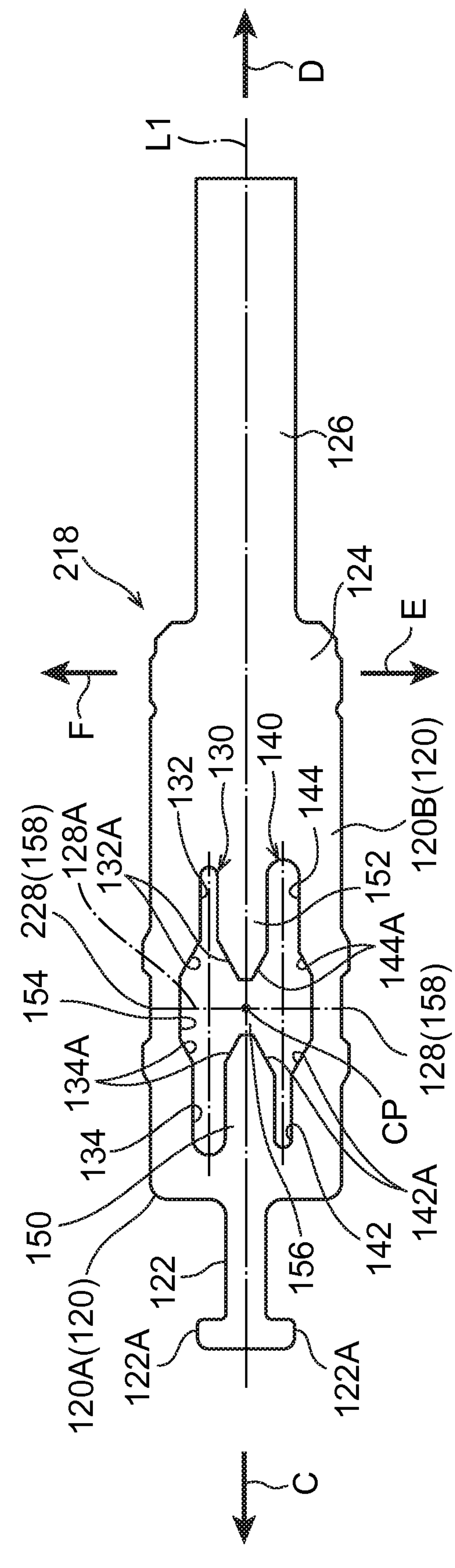
FIG. 14A is an expanded view of the earth terminal member illustrated in FIG. 13 expanded.
Figure 14B:
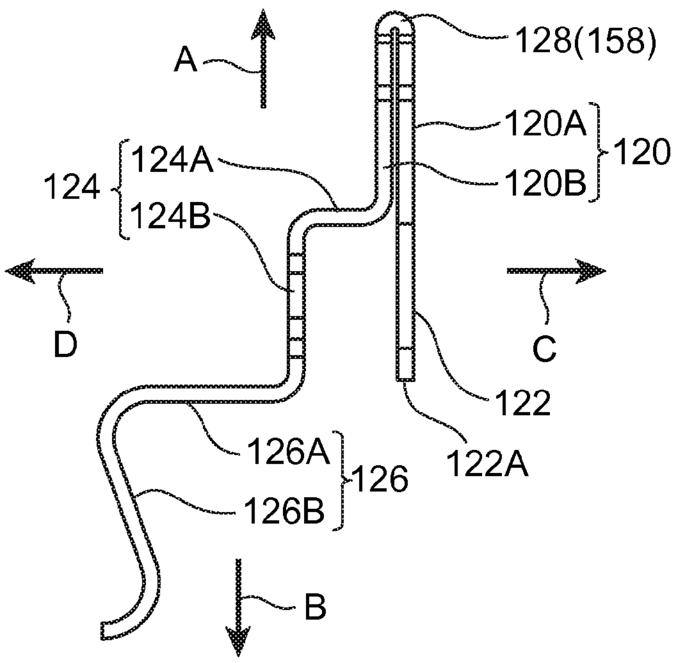
FIG. 14B is a side view of the earth terminal member illustrated in FIG. 13.
Figure 14C:
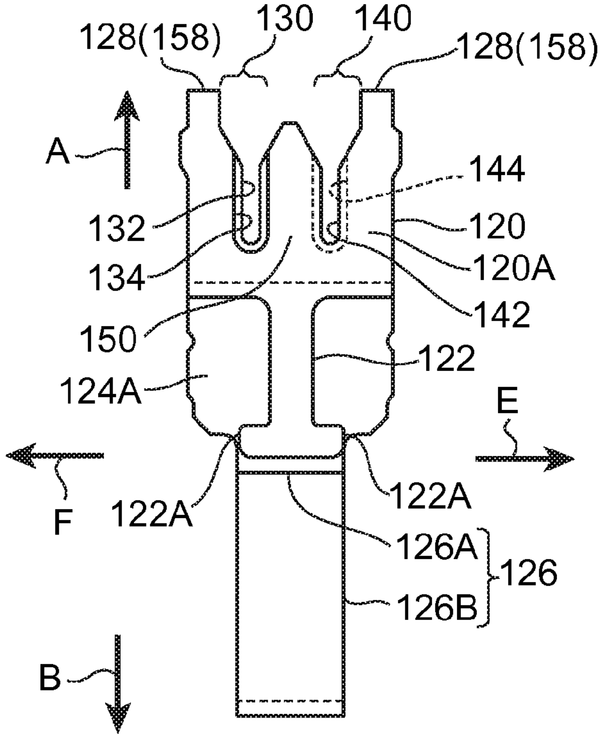
FIG. 14C is a face-on view of the terminal member illustrated in FIG. 14B, as viewed from one length direction side.

Moreover, as illustrated in FIG. 14B and FIG. 14C, a fixing portion 124 which is bent into a substantially inverted L-shaped profile is integrally formed to a lower end portion of the second connection tab 120B. More specifically, the fixing portion 124 is configured including a first fixing wall

124A extending from the lower end of the second connection tab 120B to the first direction another side, and a second fixing wall 124B extending from the leading end of the first fixing wall 124A to the lower side. The second fixing wall 124B is disposed so as to face the anchor tab 122 along the first direction.

A ground connection portion 126 which is bent into a substantially inverted L-shaped profile is integrally formed to a lower end portion of the second fixing wall 124B. More specifically, the ground connection portion 126 is configured including a coupling wall 126A extending from the lower end of the second fixing wall 124B toward the first direction another side, and a ground connection tab 126B extending from the leading end of the coupling wall 126A toward the lower side. The width dimension of the ground connection portion 126 is set so as to be smaller than the width dimension of the fixing portion 124, and the lower end portion of the ground connection tab 126B is connected to ground. More specifically, configuration is made such that, in the assembled state of the noise suppression device 250 to the motor 30, the lower end portion of the ground connection tab 126B contacts a motor housing (made from metal) of the motor 30.

Figure 16:
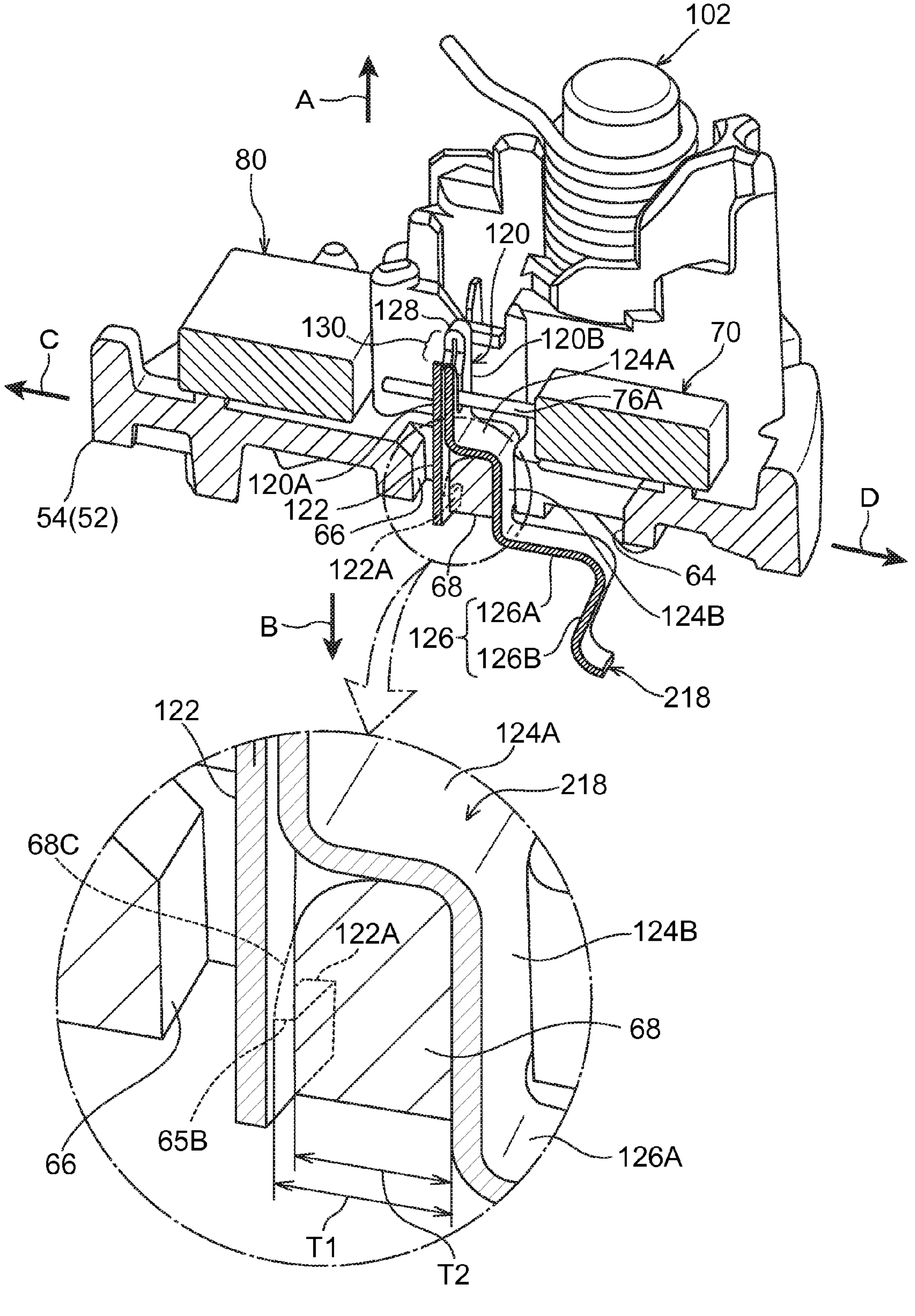
FIG. 16 is a cross-section illustrating a retained (fixed) state of the earth terminal member illustrated in FIG. 15 (a cross-section taken along line 13-13 in FIG. 15)
Figure 17:
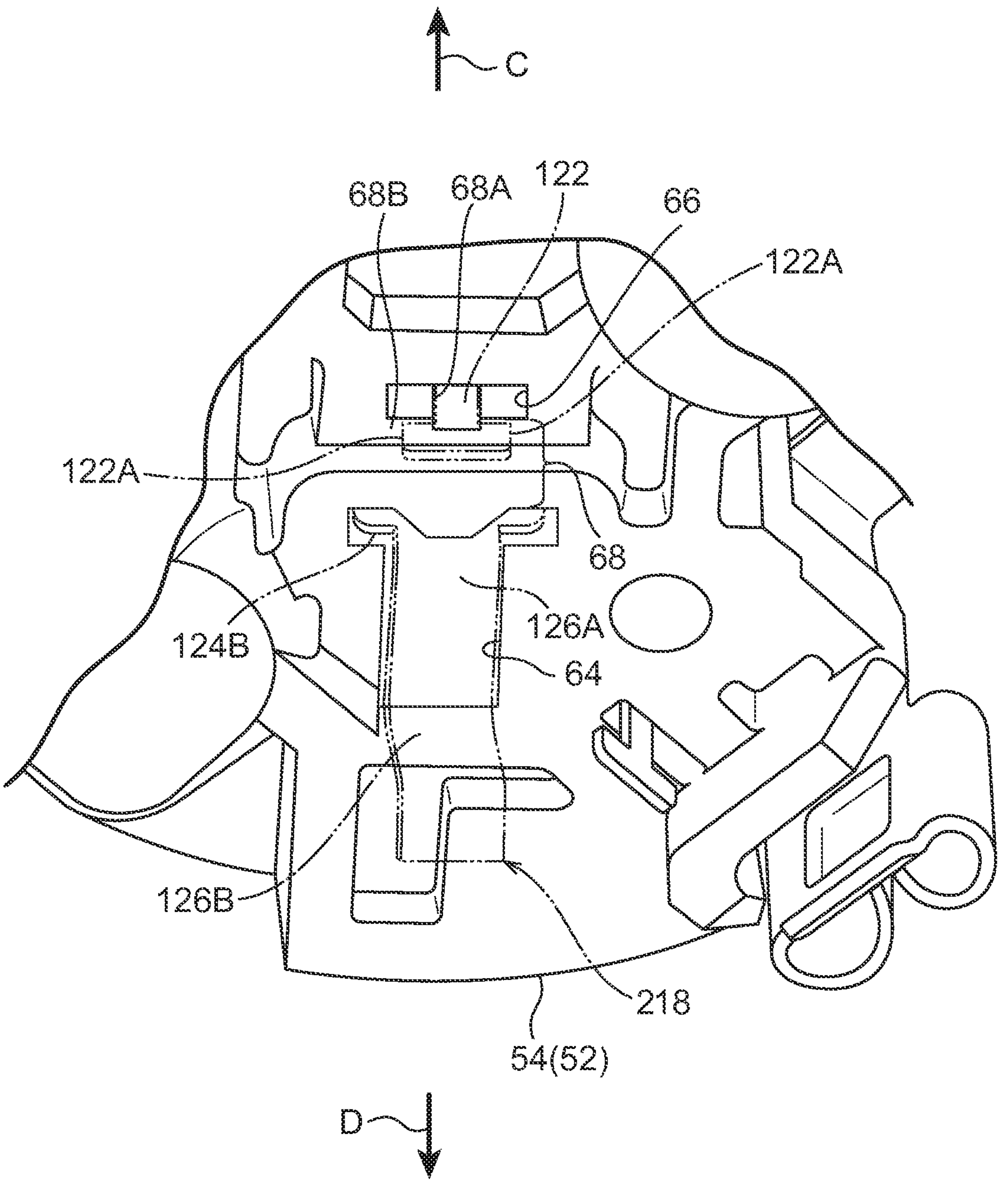
FIG. 17 is a perspective view of a state in which a hook of an anchor tab of the earth terminal member illustrated in FIG. 16 is disposed in a sloping portion, as viewed from the lower side.

The earth terminal member 218 is assembled to the base portion 54 from the upper side. More specifically, as illustrated in FIG. 16 and FIG. 17, a first insertion hole 64 is formed to the base portion 54, for inserting the ground connection portion 126 and the second fixing wall 124B of the earth terminal member 218 into. The first insertion hole 64 is formed with a substantially T shaped profile (see FIG. 17) with its length direction along the first direction. A second insertion hole 66 is also formed to the base portion 54 on the first direction one side with respect to the first insertion hole 64, in a configuration such that the anchor tab 122 is inserted into the second insertion hole 66. A portion of the base portion 54 between the first insertion hole 64 and the second insertion hole 66 configures a fixed portion 68. Namely, configuration is made such that, in the assembled state of the earth terminal member 218 to the base portion 54, the fixed portion 68 is clamped (sandwiched) between the anchor tab 122 and the second fixing wall 124B of the earth terminal member 218. Configuration is made such that in this state the first fixing wall 124A of the earth terminal member 218 abuts the upper face of the fixed portion 68 (see FIG. 16).

As illustrated in FIG. 17, a groove 68A opening to the second insertion hole 66 side is formed at one side face (the face on the first direction one side) of the fixed portion 68. The groove 68A pierces through in the up-down direction. The anchor tab 122 is disposed in the groove 68A in the assembled state of the earth terminal member 218. Namely, the thickness dimension T1 of the fixed portion 68 except for at the groove 68A (see FIG. 16) is set larger than the distance T2 between the second fixing wall 124B and the anchor tab 122 (see FIG. 16). A step 68B is formed in the lower edge portion of the one side face of the fixed portion 68, open toward the lower side. The step 68B is in communication with the groove 68A. Configuration is made such that the hook portions 122A are disposed in the step 68B in the assembled state of the earth terminal member 218 (see FIG. 16). Thus movement of the earth terminal member 218 to both sides in the first direction is restricted by the groove 68A, and movement of the earth terminal member 218 toward the upper side is restricted by the step 68B. The cross-section position of the fixed portion 68 is illustrated for convenience in FIG. 16 displaced to the second direction another side with respect to the cross-section position of the earth terminal member 218.

As illustrated in FIG. 16, a sloping portion 68C is formed at an upper portion of the one side face of the fixed portion 68. The sloping portion 68C slopes toward the first direction another side on progression toward the upper side as viewed from the second direction. Configuration is accordingly made such that during assembly of the earth terminal member 218 to the fixed portion 68, the hook portions 122A of the anchor tab 122 are guided by the sloping portion 68C such that the anchor tab 122 and the first connection tab 120A are resiliently deformed in the first direction one side for the bent portions 128 as base point. The anchor tab 122 and the first connection tab 120A then displace to the first direction another side due to the hook portions 122A being disposed in the step 68B, such that the earth terminal member 218 is fixed to the base portion 54.

Figure 15:
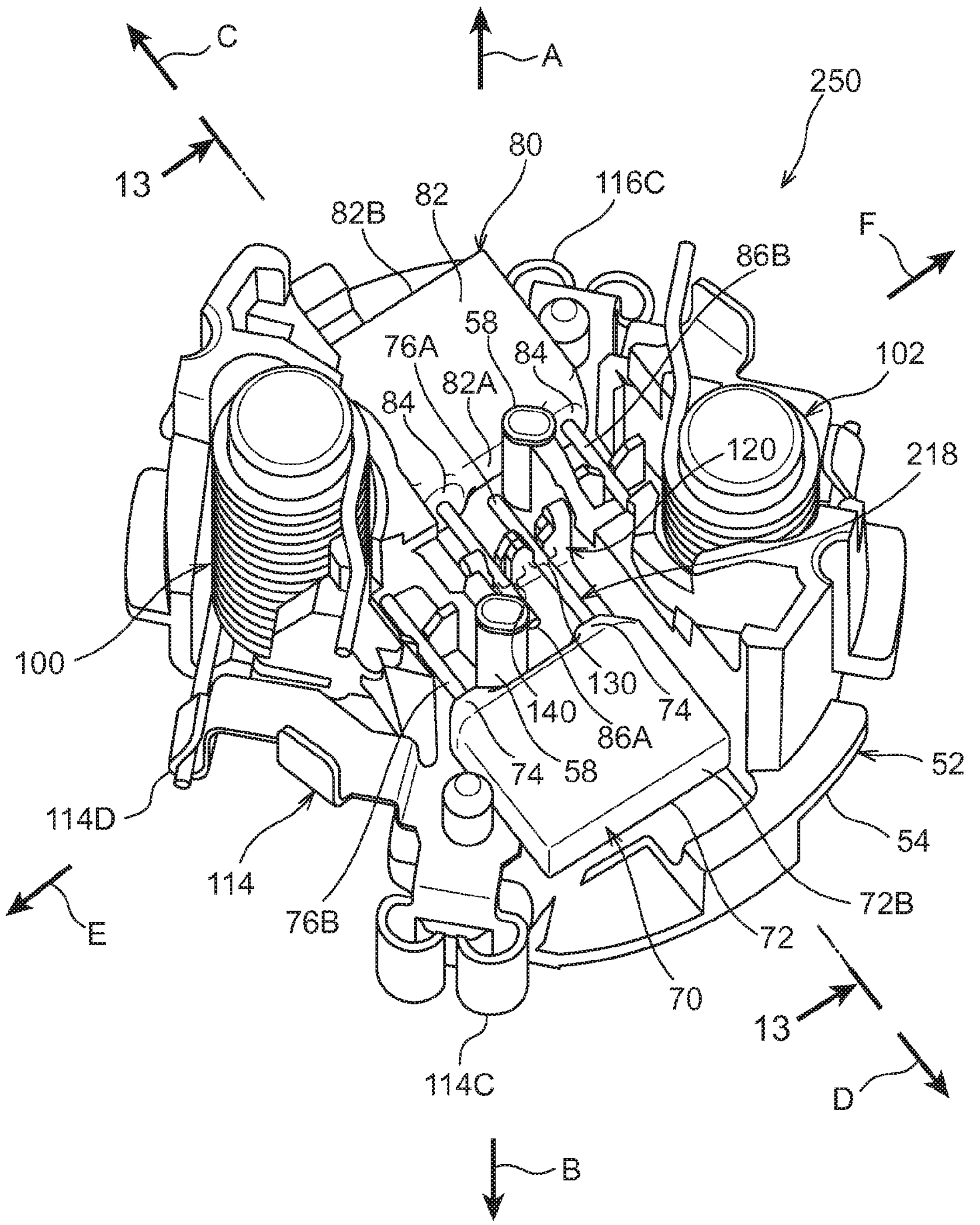
FIG. 15 is a schematic perspective view illustrating a connected state of the first capacitor and the second capacitor to the earth terminal member illustrated in FIG. 10.

As illustrated in FIG. 10 and FIG. 15, a first connecting groove 130 and a second connecting groove 140 are formed in the connection portion 120 for connecting the first terminal 76A of the first capacitor 70 and the second terminal 86A of the second capacitor 80. The first connecting groove 130 and the second connecting groove 140 are formed with slit profiles open toward the upper side, and are disposed in the vicinity of each other in a row in the width direction (the plate face direction) of the connection portion 120. More specifically, as illustrated in FIG. 10, the first connecting groove 130 is disposed, so as to correspond to the first terminal 76A of the first capacitor 70, at the second direction another side with respect to the axial line AL1 of the base portion 54. The second connecting groove 140 is disposed, so as to correspond to the second terminal 86A of the second capacitor 80, at the second direction one side with respect to the axial line AL1 of the base portion 54.

Figure 9:
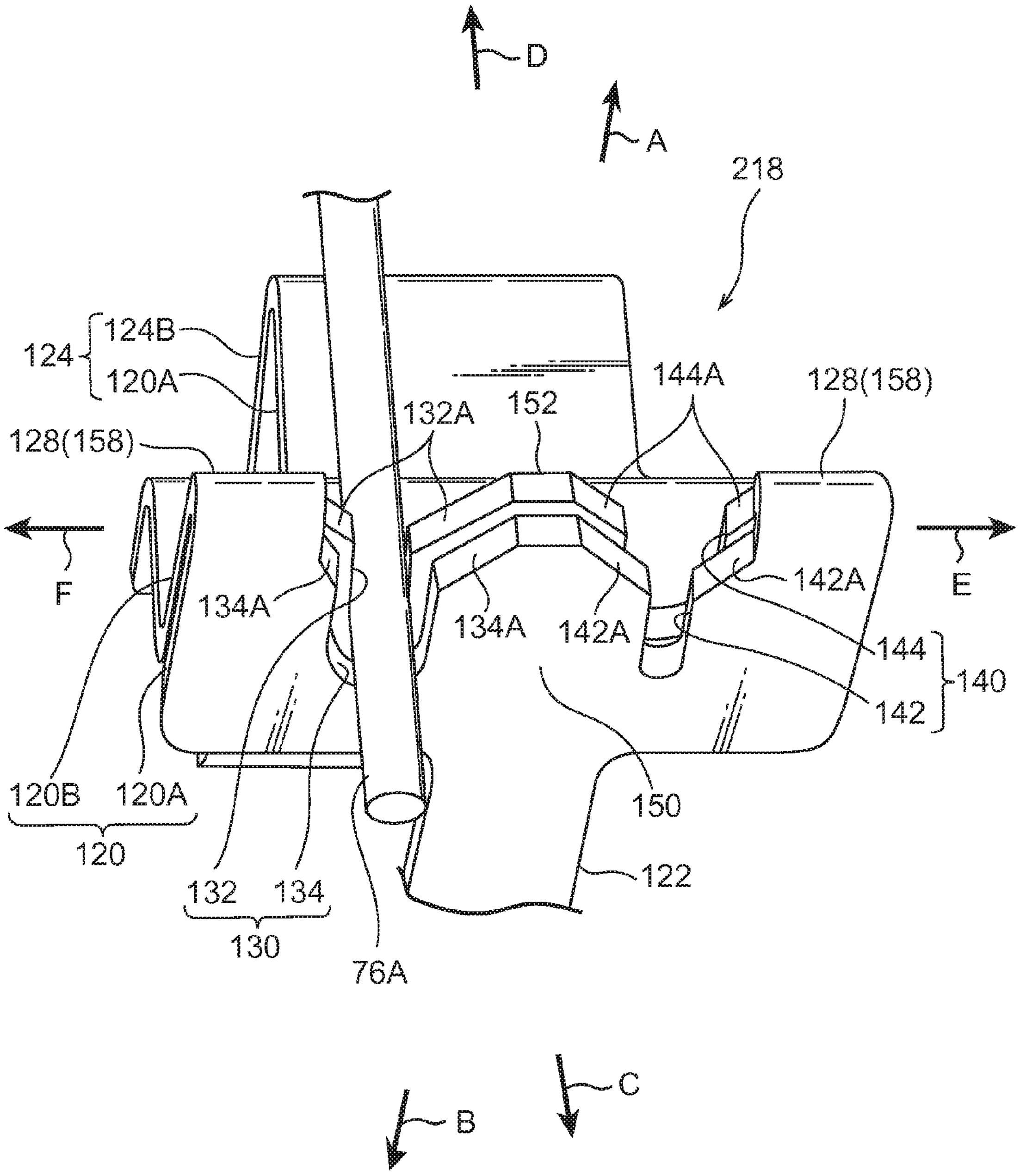
FIG. 9 is a perspective view to explain displacement of a partition portion when a first terminal is press-fitted into a connection portion of an earth terminal member according to a second exemplary embodiment.

As illustrated in FIG. 9, and FIGS. 14A and 14C, the first connecting groove 130 is configured including a first press-fit groove 132 formed in the second connection tab 120B, and a first insertion groove 134 formed in the first connection tab 120A. The first insertion groove 134 and the first press-fit groove 132 are disposed facing each other along the first direction, with the width direction central line of the first insertion groove 134 coincided with (aligned with) the width direction central line of the first press-fit groove 132. Namely, in an expanded state (in a state of not being bend-processed) of the earth terminal member 218, the first insertion groove 134 and the first press-fit groove 132 are disposed at positions in the length direction of the earth terminal member 218 symmetrical to each other about a bend line 128A of the bent portions 128 (FIG. 14A).

The groove width dimension of the first press-fit groove 132 is set to be slightly smaller than the diameter of the first terminal 76A, and the groove width dimension of the first insertion groove 134 is set to be larger than the diameter of the first terminal 76A. Thus when the first terminal 76A is connected (inserted) into the first connecting groove 130, the first terminal 76A is press-fit connected to the first press-fit groove 132, and is inserted into the first insertion groove 134 in a non-press-fit state. Namely, the first terminal 76A is connected to the second connection tab 120B.

Moreover, a pair of taper portions 132A as "first taper portions" are formed to the opening portion of the first press-fit groove 132, each sloping toward the groove width direction outside on progression toward the upper side. A pair of taper portions 134A as "second taper portions" are formed to the opening portion of the first insertion groove 134, each sloping toward the groove width direction outside on progression toward the upper side. In the expanded state of the earth terminal member 218, the taper portions 132A and the taper portions 134A are disposed in the length direction of the earth terminal member 218 at positions symmetrical to each other about the bend line 128A (see FIG. 14A).

The second connecting groove 140 is configured including a second press-fit groove 142 formed to the first connection tab 120A, and a second insertion groove 144 formed to the second connection tab 120B. The second press-fit groove 142 and the second insertion groove 144 are disposed facing each other along the first direction, with the width direction central line of the second press-fit groove 142 coincided with (aligned with) the width direction central line of the second insertion groove 144. Namely, in the expanded state of the earth terminal member 218, the second press-fit groove 142 and the second insertion groove 144 are disposed in the length direction of the earth terminal member 218 at positions symmetrical to each other about the bend line 128A (see FIG. 14A).

The groove width dimension of the second press-fit groove 142 is set to be slightly smaller than the diameter of the second terminal 86A, and the groove width dimension of the second insertion groove 144 is set to be larger than the diameter of the second terminal 86A. Thus when the second terminal 86A is connected (inserted) into the second connecting groove 140, the second terminal 86A is press-fit connected to the second press-fit groove 142, and is inserted into the second insertion groove 144 in a non-press-fit state. Namely, the second terminal 86A becomes connected to the first connection tab 120A.

Moreover, a pair of taper portions 142A as "first taper portions" are formed to the opening portion of the second press-fit groove 142, each sloping toward the groove width direction outside on progression toward the upper side. A pair of taper portions 144A as "second taper portions" are formed to the opening portion of the second insertion groove 144, each sloping toward the groove width direction outside on progression toward the upper side. In the expanded state of the earth terminal member 218, the taper portions 142A and the taper portions 144A are disposed in the length direction of the earth terminal member 218 at positions symmetrical to each other about the bend line 128A (see FIG. 14A).

A portion of the first connection tab 120A, which is between the first insertion groove 134 and the second press-fit groove 142 configures a partition portion 150, and A portion of the second connection tab 120B, which is between the first press-fit groove 132 and the second insertion groove 144 configures a partition portion 152. Thus in the first connection tab 120A, the first insertion groove 134 is disposed adjacent in the width direction of the connection portion 120 to the second press-fit groove 142, with the partition portion 150 being therebetween. In the second connection tab 120B, the second insertion groove 144 is disposed adjacent in the width direction of the connection portion 120 to the first press-fit groove 132, with the partition portion 152 being therebetween.

As illustrated in FIG. 14A, in the expanded state of the earth terminal member 218, the first connecting groove 130 and the second connecting groove 140 are formed by a single hole 154. Namely, a coupling portion 156 that couples the first connecting groove 130 and the second connecting groove 140 is formed between the partition portion 150 and the partition portion 152, and the hole 154 is formed with a substantially H-shaped profile. The first connection tab 120A and the second connection tab 120B are thereby coupled together at both width direction end portions of the connection portion 120. More specifically, the first connection tab 120A and the second connection tab 120B are coupled at the width direction outsides of the connection portion 120 with respect to the first connecting groove 130 and the second connecting groove 140. The coupled portions configure coupling portions 158, and the bent portions 128 are formed by bending processing of the coupling portions 158. Moreover, the hole 154 is shaped so as to have point symmetry about a central point CP where the width direction central line of the connection portion 120 (namely the first reference line L1) and the bend line 128A intersect. In other words, a configuration is achieved in which the first connecting groove 130 and the second connecting groove 140 have point symmetry about the central point CP.

As explained above, in the earth terminal member 218 of the present exemplary embodiment, the second terminal 86A is connected to the first connection tab 120A, and the first terminal 76A is connected to the second connection tab 120B. Namely, in the present exemplary embodiment, the number of connection tabs of the connection portion 120 are set so as to correspond to the number of terminals to be connected to the connection portion 120 (2 in the present exemplary embodiment), with a one-to-one correspondence between the connection tabs and the terminals (the first connection tab 120A corresponds to the second terminal 86A, and the second connection tab 120B corresponds to the first terminal 76A). The press-fit groove for press-fitting the corresponding terminal at each of the connection tabs is formed only at one location, and the press-fit grooves are disposed so as to be displaced from each other in the width direction of the connection portion 120. In each of the connection tabs, the insertion groove is formed into which the terminal which is press-fitted in the another connection tab is inserted.

Explanation follows regarding operation and advantageous effects of the present exemplary embodiment.

In the noise suppression device 250, when the first terminal 76A of the first capacitor 70 and the second terminal 86A of the second capacitor 80 are being connected to the connection portion 120 of the earth terminal member 218, the first terminal 76A is inserted into the first connecting groove 130, and the second terminal 86A is inserted into the second connecting groove 140.

In the connection portion 120, the second press-fit groove 142 is formed in the first connection tab 120A, and the first press-fit groove 132 is formed in the second connection tab 120B. The first press-fit groove 132 and the second press-fit groove 142 are disposed displaced from each other in the width direction of the earth terminal member 218. The first terminal 76A (the second terminal 86A) is press-fitted into the first press-fit groove 132 (the second press-fit groove 142). In the connection portion 120, the first insertion groove 134 is formed in the first connection tab 120A, and the second insertion groove 144 is formed in the second connection tab 120B. The first insertion groove 134 (the second insertion groove 144) is adjacent to the second press-fit groove 142 (the first press-fit groove 132). The first terminal 76A (the second terminal 86A) is inserted into the first insertion groove 134 (the second insertion groove 144). In the connection portion 120, the connection tabs into which the first terminal 76A and the second terminal 86A are respectively press-fit are accordingly different to each other. This thereby enables a change in the groove width dimension of the second press-fit groove 142 (the first press-fit groove 132), arising from displacement (deformation) of the second connection tab 120B (the first connection tab 120A), to be suppressed, even if the second connection tab 120B (the first connection tab 120A) displaces (deforms) when the first terminal 76A (the second terminal 86A) is press-fitted into the first press-fit groove 132 (the second press-fit groove 142). The first terminal 76A can accordingly be press-fit connected to the first press-fit groove 132, and the second terminal 86A can be press-fit connected to the second press-fit groove 142. This thereby enables a good connection of the first terminal 76A and the second terminal 86A to the earth terminal member 218.

More detail is given below regarding this point. Namely, due to the groove width dimension of the first press-fit groove 132 being smaller than the diameter dimension of the first terminal 76A, as illustrated in FIG. 9, when the first terminal 76A is being press-fit into the first press-fit groove 132, force acts on the earth terminal member 218 to expand the first press-fit groove 132 toward the groove width direction outsides (in the arrow E direction and the arrow F direction in FIG. 9). The partition portion 152 configuring the first press-fit groove 132 is accordingly displaced to the second insertion groove 144 side (the arrow E direction side in FIG. 9).

Thus were both the first press-fit groove 132 and the second press-fit groove 142 to be formed to the second connection tab 120B on the same plate face (namely a configuration in which the second insertion groove 144 is swapped with the second press-fit groove 142), then the groove width dimension of the second press-fit groove 142 would become smaller due to the partition portion 152 displacing to the second press-fit groove 142 side when the first terminal 76A is press-fitted into the first press-fit groove 132. It would therefore be difficult to press-fit the second terminal 86A into the second press-fit groove 142.

In contrast thereto, in the earth terminal member 218 of the present exemplary embodiment, the second press-fit groove 142 is formed at the first connection tab 120A, and the first press-fit groove 132 is formed at the second connection tab 120B. Namely, in the present exemplary embodiment, connection tabs are provided to so as to correspond to the number of terminals for connection, with a one-to-one correspondence between the respective connection tabs and terminals. This thereby enables or helps to prevent the groove width dimension of the second press-fit groove 142 (the first press-fit groove 132) from getting smaller even if the partition portion 152 (the partition portion 150) displaces (deforms) when the first terminal 76A (the second terminal 86A) is press-fitted into the first press-fit groove 132 (the second press-fit groove 142).

Moreover, the first insertion groove 134 is formed at the first connection tab 120A, and the second insertion groove 144 is formed at the second connection tab 120B, and the first insertion groove 134 (the second insertion groove 144) is disposed adjacent to the second press-fit groove 142 (the first press-fit groove 132). This thereby enables displacement of the partition portion 152 (the partition portion 150) arising when the first terminal 76A (the second terminal 86A) is press-fit into the first press-fit groove 132 (the second press-fit groove 142) to be absorbed by the second insertion groove 144 (the first insertion groove 134), and enables the second terminal 86A (the first terminal 76A) to be disposed inside the second insertion groove 144 (the first insertion groove 134). Due to the above, a good connection of the first terminal 76A and the second terminal 86A to the earth terminal member 218 can be achieved even in a case in which the first terminal 76A and the second terminal 86A are disposed in the vicinity of each other.

Moreover, the first connection tab 120A and the second connection tab 120B are coupled together by the bent portions 128. This thereby enables the earth terminal member 218 to be configured from single metal plate member, and for the first connection tab 120A and the second connection tab 120B to be formed by bending processing of the plate member. This thereby enables the configuration of the earth terminal member 218 to be simplified in comparison to a case, for example, in which the first connection tab 120A and the second connection tab 120B are coupled together such as by welding, and enables an increase in cost of the earth terminal member 218 to be suppressed.

Moreover, the first terminal 76A and the second terminal 86A configure the respective earth terminals of the first capacitor 70 and the second capacitor 80, and are connected to the earth terminal member 218. This thereby enables the earth terminal member 218 to be configured as a common earth (ground) contact for the first capacitor 70 and the second capacitor 80.

In the earth terminal member 218, the bent portions 128 are disposed at the connection portion 120 width direction outsides of the first connecting groove 130 and the second connecting groove 140. Namely, the partition portion 150 and the partition portion 152 are not coupled together in the connection portion 120. Thus even if the partition portion 152 (the partition portion 150) displaces in the width direction of the connection portion 120 when the first terminal 76A (the second terminal 86A) is being press-fitted into the first press-fit groove 132 (the second press-fit groove 142), this displacement is not transmitted to the partition portion 150 (the partition portion 152). This thereby further enables or helps to prevent change in the groove width dimension of the second press-fit groove 142 (first press-fit groove 132). As a result, a good press-fit connection of the first terminal 76A to the first press-fit groove 132 can thereby be achieved, and a good press-fit connection of the second terminal 86A to the second press-fit groove 142 can also be achieved.

In the expanded state of the earth terminal member 218, the first insertion groove 134 (the second insertion groove 144) and the first press-fit groove 132 (the second press-fit groove 142) are disposed at positions symmetrical to the bend line 128A of the bent portion 128. This thereby enables the first insertion groove 134 (the second insertion groove 144) and the first press-fit groove 132 (the second press-fit groove 142) to be easily configured to correspond to (align with) each other.

Moreover, in the expanded state of the earth terminal member 218, the taper portions 132A (the taper portions 142A) are disposed at positions symmetrical about the bend line 128A of the bent portion 128 to the taper portions 134A (the taper portions 144A). The taper portions 132A (the taper portions 142A) and the taper portions 134A (taper portions 144A) can accordingly be easily configured so as to correspond to (align with) each other.

Figure 18A:
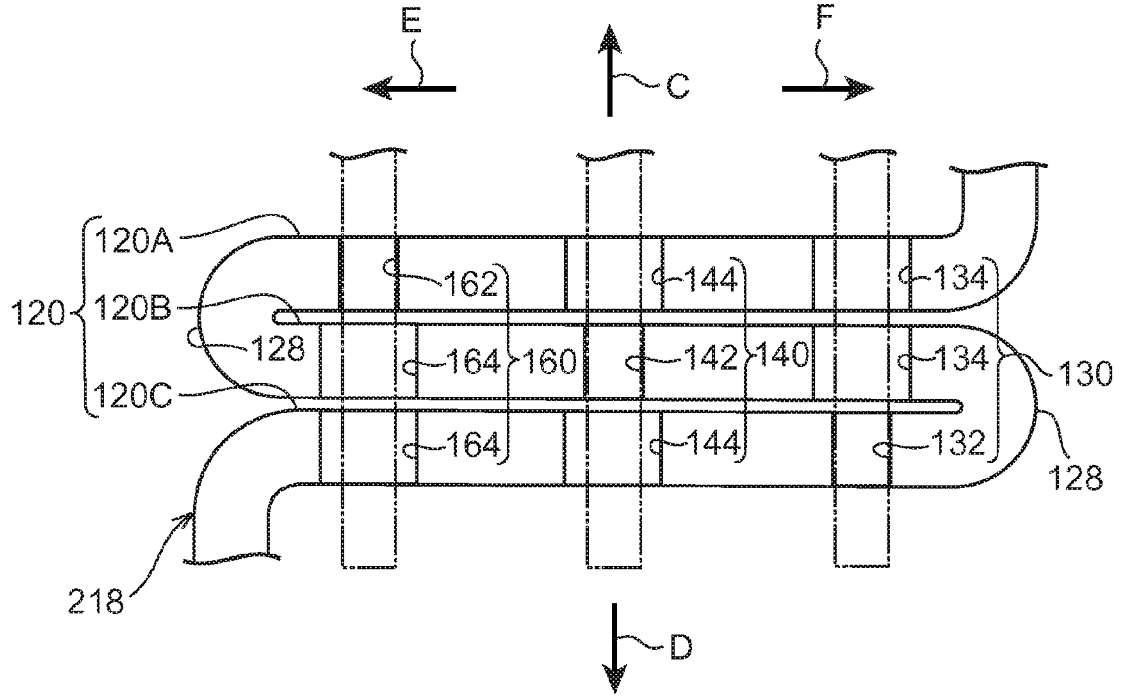
FIG. 18A is a plan view of an example of a modified example of the connection portion of the earth terminal member illustrated in FIG. 9, as viewed from the upper side.
Figure 18B:
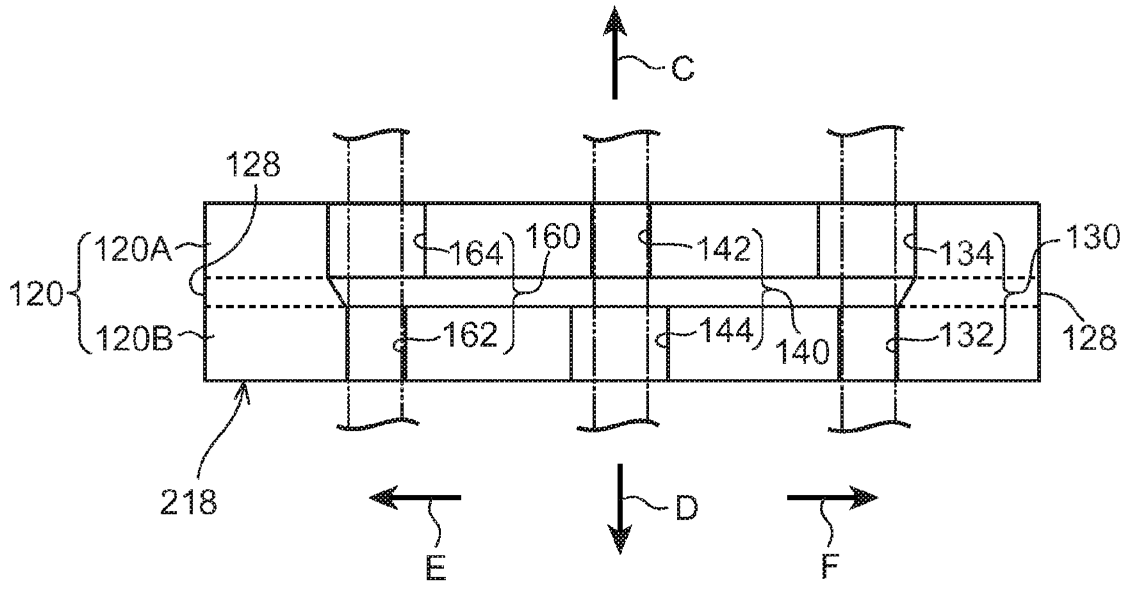
FIG. 18B is a plan view illustrating another example of a modified example of the connection portion of the earth terminal member.

In the present exemplary embodiment, two terminals (the first terminal 76A and the second terminal 86A) are connected to the connection portion 120; however there may be 3 or more terminals connected to the connection portion 120 according to the embodiment of the noise suppression device 250. For example, as illustrated in FIG. 18A, the connection portion 120 may be configured with 3 plates of connection tabs (a first connection tab 120A, a second connection tab 120B, and a third connection tab 120C). In such a case, configuration may be made such that the width direction of the earth terminal member 218 and the width direction of the connection portion 120 may not coincide with each other. Namely, configuration may be made such that a first connecting groove 130, a second connecting groove 140 and a third connecting groove 160 configure grooves that are open to one side in the width direction of the earth terminal member 218. The first connecting groove 130, the second connecting groove 140, and the third connecting groove 160 are then respectively configured such that there is 1 location of press-fit groove and 2 locations of insertion grooves, and the respective press-fit grooves are disposed displaced in the width direction of the connection portion 120 with respect to each other. In FIG. 18A and FIG. 18B, the reference numeral 162 is appended to the press-fit groove in the third connecting groove 160, and the reference numeral 164 is appended to the insertion grooves in the third connecting groove 160. The terminals of the electrical elements inserted into the first connecting groove 130, the second connecting groove 140, and the third connecting groove 160 are illustrated in the drawings by double-dotted intermittent lines.

Moreover, for example as illustrated in FIG. 18B, similarly to in the present exemplary embodiment, the connection portion 120 may be configured by two plates of connection tabs (the first connection tab 120A and the second connection tab 120B), and the press-fit groove 162 of the third connecting groove 160 formed in the second connection tab 120B, in addition to forming the insertion groove 164 of the third connecting groove 160 in the first connection tab 120A. Namely, a configuration may be adopted in which press-fit grooves and insertion grooves are arranged in each of the connection tabs alternately to each other on progression along the width direction of the connection tabs. In such a case, deformation of a partition portion when a terminal is being press-fitted into a press-fit groove is absorbed by the insertion groove, thereby enabling or helping to prevent change in the groove width dimension of the press-fit grooves.

In the present exemplary embodiment, the first connection tab 120A and the second connection tab 120B of the connection portion 120 are integrated together by the bent portion 128 of the coupling portion 158. However the first connection tab 120A and the second connection tab 120B may be integrated together by welding or the like.

In the present exemplary embodiment, the coupling portion 158 of the connection portion 120 is formed at the upper end portion of both the first connection tab 120A and the second connection tab 120B. However the coupling portion 158 may be formed to one of the outside end portions in the width direction of the first connection tab 120A and the second connection tab 120B.

In the present exemplary embodiment, the earth terminal member 218 is applied to the noise suppression device 250 of washer pump 210. The earth terminal member 218 may however be applied to another device. For example, the earth terminal member 218 may be applied to a surge absorption device or the like installed in a vehicle wiper device.

What is claimed is:

1. A pump device comprising:

a housing formed in a tubular shape, that includes:
  a motor housing section that houses a motor, and
  a pump chamber that houses an impeller which is axially supported at a rotation shaft of the motor so as to be capable of rotating integrally with the rotation shaft;

a cap that includes a power supply terminal for connecting to an external connector and that closes an opening of the motor housing section;

a noise suppression device that is provided between the cap and the motor, that is connected between the power supply terminal and the motor, and that suppresses noise from being generated during driving of the motor;

a first electrical element that configures the noise suppression device, that is disposed such that a height direction of the first electrical element is oriented along an orthogonal direction orthogonal to an axial direction of the housing, and that includes a pair of first terminals that extend from one end portion of a first element body of the first electrical element toward one side in the orthogonal direction; and a second electrical element that configures the noise suppression device, that is disposed such that a height direction of the second electrical element is oriented along the orthogonal direction, and that includes a pair of second terminals that extend from one end portion of a second element body of the second electrical element toward another side in the orthogonal direction, wherein one of the second terminals is disposed between the pair of first terminals as viewed along the axial direction of the housing.

2. The pump device of claim 1, wherein the noise suppression device includes a retaining member that retains the first electrical element and the second electrical element, the retaining member including:

a base portion on which the first electrical element and the second electrical element are mounted, and a pair of stopper portions that abut the one end portion of the first element body of the first electrical element and the one end portion of the second element body of the second electrical element, respectively.

3. The pump device of claim 2, wherein the retaining member further includes a pair of biasing portions that are resiliently deformable in the orthogonal direction, that abut another end portion of the first element body of the first electrical element and another end portion of the second element body of the second electrical element, respectively, and that bias the first element body of the first electrical element and the second element body of the second electrical element toward respective sides of the stopper portions.

4. The pump device of claim 3, wherein:

the biasing portions include sloping faces that abut the another end portion of the first element body of the first electrical element and the another end portion of the second element body of the second electrical element, respectively; and the sloping faces are sloped, with respect to the axial direction of the housing, toward respective sides of the first element body of the first electrical element and the second element body of the second electrical element, and toward a base portion.

5. The pump device of claim 3, wherein the retaining member is formed from resin, and the base portion and the biasing portions are integrally formed.

6. The pump device of claim 1, wherein the first electrical element and the second electrical element are respectively a first capacitor and a second capacitor.

7. The pump device of claim 1, wherein:

the noise suppression device includes a pair of choke coils and a third electrical element in addition to the first electrical element and the second electrical element;

the choke coils are disposed between the first electrical element and the second electrical element in a circumferential direction of the housing; and the third electrical element is disposed between the pair of choke coils as viewed along the axial direction of the housing, and the third electrical element is disposed so as to overlap with the first electrical element and the second electrical element in the axial direction of the housing.

8. A pump device comprising:

a housing formed in a tubular shape, that includes:

a motor housing section that houses a motor, and a pump chamber that houses an impeller which is axially supported at a rotation shaft of the motor so as to be capable of rotating integrally with the rotation shaft;

a cap that includes a power supply terminal for connecting to an external connector and that closes an opening of the motor housing section; and a noise suppression device that includes a terminal member including:

a plurality of connection tabs that are configured from a metal plate member, the connection tabs being disposed adjacently in a plate thickness direction thereof;

a coupling portion that couples the connection tabs;

first and second press-fit grooves that are formed at the respective connection tabs such that the first and the second press-fit grooves are disposed so as to be displaced from each other in a width direction of the connection tabs, terminals of electrical elements being press-fitted into the first and the second press-fit grooves respectively; and first and second insertion grooves that are formed at the respective connection tabs such that the first and the second insertion grooves are disposed so as to be displaced from each other in the width direction, wherein at one of the connection tabs, the first insertion groove is disposed adjacent to the second press-fit groove in the width direction, at another one of the connection tabs, the second insertion groove is disposed adjacent to the first press-fit groove in the width direction, one of the terminals of the electrical elements, which is press-fitted into the first press-fit groove, is inserted in the first insertion groove, and another one the terminals of the electrical elements, which is press-fitted into the second press-fit groove, is inserted in the second insertion groove, wherein the noise suppression device is provided between the cap and the motor, is connected between the power supply terminal and the motor, and suppresses noise from being generated during driving of the motor.

* * * * *